(12) United States Patent
Duerr et al.

(10) Patent No.: US 10,717,338 B2
(45) Date of Patent: Jul. 21, 2020

(54) HEATING AND COOLING MODULE

(71) Applicant: MAHLE International GmbH, Stuttgart (DE)

(72) Inventors: Gottfried Duerr, Ludwigsburg (DE); Joachim Michael Haug, Mundelsheim (DE); Herbert Hofmann, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 281 days.

(21) Appl. No.: 15/263,410

(22) Filed: Sep. 13, 2016

(65) Prior Publication Data

US 2016/0375740 A1    Dec. 29, 2016

Related U.S. Application Data

(63) Continuation of application No. PCT/EP2015/055178, filed on Mar. 12, 2015.

(30) Foreign Application Priority Data

Mar. 17, 2014 (DE) ........................ 10 2014 204 935

(51) Int. Cl.
*B60H 1/00* (2006.01)
*B60H 1/32* (2006.01)
(Continued)

(52) U.S. Cl.
CPC ..... *B60H 1/00342* (2013.01); *B60H 1/00278* (2013.01); *B60H 1/00485* (2013.01);
(Continued)

(58) Field of Classification Search
CPC . H01M 10/60; B60H 1/3227; B60H 1/00278; B60H 1/00485; B60H 1/00899;
(Continued)

(56) References Cited

U.S. PATENT DOCUMENTS 4,129,014 A * 12/1978 Chubb .................. F25B 25/005
165/104.11
6,318,115 B1 * 11/2001 Kirchner ............... F25B 43/003
62/292
(Continued)

FOREIGN PATENT DOCUMENTS

CN         1620590 A     5/2005
CN       101547803 A     9/2009
(Continued)

*Primary Examiner* — Len Tran
*Assistant Examiner* — Jenna M Hopkins
(74) *Attorney, Agent, or Firm* — Muncy, Geissler, Olds & Lowe, P.C.

(57) ABSTRACT

A heating and cooling module for controlling the temperature of at least two coolant circuits, having an evaporator region and a condenser region. The evaporator region has a first flow section through which a first coolant can flow, and the condenser region has a second flow section through which a second coolant can flow. The heating and cooling module has a third flow section through which a refrigerant can flow. The evaporator region and the condenser region are arranged on a common base plate which has the fluid inlets and the fluid outlets for the first coolant, the second coolant, and the refrigerant. The base plate has flow channels, through each of which one of the coolants or the refrigerant can flow. The evaporator region and the condenser region are fluidically connected to the respective fluid inlets and the respective fluid outlets of the base plate via the flow channels.

15 Claims, 13 Drawing Sheets

(51) Int. Cl.
  *F25B 43/00* (2006.01)
  *F28D 9/00* (2006.01)
  *F25B 40/02* (2006.01)
  *H01M 10/60* (2014.01)
  *F25B 39/00* (2006.01)
  *H01M 10/625* (2014.01)
  *H01M 10/6556* (2014.01)
  *F28F 3/08* (2006.01)
  *F25B 25/00* (2006.01)

(52) U.S. Cl.
  CPC ..... B60H 1/00571 (2013.01); B60H 1/00899 (2013.01); B60H 1/3227 (2013.01); B60H 1/32284 (2019.05); F25B 39/00 (2013.01); F25B 40/02 (2013.01); F25B 43/003 (2013.01); F28D 9/0093 (2013.01); F28F 3/08 (2013.01); H01M 10/60 (2015.04); H01M 10/625 (2015.04); H01M 10/6556 (2015.04); F25B 25/005 (2013.01); F25B 2339/047 (2013.01)

(58) Field of Classification Search
  CPC ...... B60H 1/3229; F25B 25/005; F25B 39/00; F25B 40/02; F25B 43/003; F25B 2339/047; F25B 2400/05; F28D 9/0093
  USPC .................. 62/506; 165/104.11, 164
  See application file for complete search history.

(56) References Cited

U.S. PATENT DOCUMENTS

| | | | |
|---|---|---|---|
| 7,650,935 B2 | 1/2010 | Demuth et al. | |
| 7,753,105 B2 | 7/2010 | Acre | |
| 8,899,062 B2 | 12/2014 | Kadle et al. | |
| 8,991,476 B2* | 3/2015 | Tsubone | F28D 20/0039 165/10 |
| 9,093,729 B2 | 7/2015 | Wesner et al. | |
| 10,260,817 B2* | 4/2019 | Fetzer | F28D 9/005 |
| 10,625,572 B2* | 4/2020 | Duerr | F25B 25/005 |
| 2004/0055322 A1* | 3/2004 | Monfarad | F25B 1/00 62/259.2 |
| 2004/0079100 A1* | 4/2004 | Monfarad | F04B 35/045 62/259.2 |
| 2009/0301125 A1* | 12/2009 | Myles | B60H 1/00271 62/323.1 |
| 2010/0000713 A1 | 1/2010 | Takahashi et al. | |
| 2010/0126706 A1* | 5/2010 | Tsubone | F28D 20/0039 165/160 |
| 2011/0180235 A1* | 7/2011 | Garimella | F25B 15/00 165/104.11 |
| 2011/0232859 A1* | 9/2011 | Vo | F24F 5/001 165/48.1 |
| 2012/0060550 A1 | 3/2012 | Mann | |
| 2012/0210746 A1* | 8/2012 | Kadle | F25B 1/00 62/498 |
| 2012/0216562 A1* | 8/2012 | Kadle | B60H 1/00899 62/434 |
| 2012/0222846 A1* | 9/2012 | Kadle | F28D 9/005 165/166 |
| 2013/0000341 A1 | 1/2013 | De Piero et al. | |
| 2014/0373560 A1* | 12/2014 | Koberstein | F25B 40/00 62/115 |
| 2015/0276320 A1* | 10/2015 | Mueller | F28D 9/0093 165/166 |
| 2016/0265490 A1* | 9/2016 | Azevedo Junior | F28D 9/0037 |
| 2017/0122669 A1* | 5/2017 | Takahashi | F25B 39/04 |
| 2017/0159660 A1* | 6/2017 | Hashimoto | F01C 1/00 |
| 2017/0167798 A1* | 6/2017 | Espersen | F28D 15/0266 |
| 2019/0086155 A1* | 3/2019 | Fujita | F28D 9/0037 |

FOREIGN PATENT DOCUMENTS

| | | | | |
|---|---|---|---|---|
| CN | 103370594 A | | 10/2013 | |
| CN | 108507218 A | * | 9/2018 | |
| DE | 10 2010 026 507 A1 | | 1/2012 | |
| DE | 10 2010 048 015 A1 | | 4/2012 | |
| DE | 10 2012 002 768 A1 | * | 9/2012 | .......... B60H 1/3227 |
| DE | 10 2011 078 136 A1 | | 12/2012 | |
| EP | 2174810 A2 | * | 4/2010 | ........ B60H 1/00899 |
| EP | 2 174 810 B1 | | 11/2012 | |
| WO | WO-0023753 A1 | * | 4/2000 | ............ F04B 43/043 |
| WO | WO 2004/042309 A2 | | 5/2004 | |
| WO | WO-2010014878 A1 | * | 2/2010 | ............. F25B 15/00 |
| WO | WO 2012/095531 A1 | | 7/2012 | |
| WO | WO-2012112634 A1 | * | 8/2012 | ................ F25B 1/00 |

* cited by examiner

HEATING AND COOLING MODULE

This nonprovisional application is a continuation of International Application No. PCT/EP2015/055178, which was filed on Mar. 12, 2015, and which claims priority to German Patent Application No. 10 2014 204 935.0, which was filed in Germany on Mar. 17, 2014, and which are both herein incorporated by reference.

BACKGROUND OF THE INVENTION

Field of the Invention

The invention relates to a heating and cooling module for controlling the temperature of at least two coolant circuits, having an evaporator region and a condenser region, the evaporator region having a first flow section that can be flowed through by a first coolant, and the condenser region having a second flow section that can be flowed through by a second coolant, and wherein the heating and cooling module has a third flow section that can be flowed through by a refrigerant.

Description of the Background Art

In motor vehicles, evaporators are regularly used to cool the interior. Further, condensers are used which emit the heat to the outside air. Regularly, other components are added to refrigerant circuits in order to realize additional functionalities. This happens, for example, to enable heating of the interior or to cool additionally built-in batteries. This is particularly increasingly the case with electrically driven vehicles in order to operate the batteries needed for driving in an optimal temperature window.

Due to these further components, the refrigerant circuits become very complex and prone to errors. Furthermore, there is a risk of an unwanted refrigerant migration in idle areas of the refrigerant circuit. Idle areas are areas which are, for example, temporarily not flowed through. For control and regulation of these circuits, switching valves are necessary which entail an increased installation effort and continue to increase the risk of errors.

In an alternative embodiment, the refrigerant circuit can be connected to a hot and a cold water-Glysantin-cycle. The heat can thereby be extracted via any air/water heat exchanger. To provide the warmer water and the colder water, at least a so-called chiller and a condenser are needed. In this case, a chiller serves in particular to cool a medium flowing around the chiller. Thus, in the simplest case, a circuit generated in this way may include a chiller, a condenser, a thermostatic expansion valve (TXV) and a compressor. In addition, a collector may be provided to compensate for variations in fluid. Also, a water-side sub-cooling section or an internal heat exchanger may be provided to bring about an improvement in efficiency.

A disadvantage of the solutions known in the prior art is that the plurality of elements used requires a large amount of space. Further, a plurality of connection lines must be provided to connect the individual elements with one another. These connections raise the assembly cost and represent an additional source for errors. Furthermore, it is disadvantageous that no internal heat exchangers or chillers are integrated in previously known solutions, which are formed by a combination of multiple heat transfer elements in one unit.

SUMMARY OF THE INVENTION

It is therefore an object of the present invention to provide a heating and cooling module having a compact structure and being easy to manufacture. Moreover, it is the object of the invention to provide a heating and cooling module which is easily adaptable to different applications.

An exemplary embodiment of the invention provides a heating and cooling module for controlling the temperature of at least two coolant circuits, with an evaporator region and with a condenser region, wherein the evaporator region has a first flow section which can be flowed through by a first coolant, and the condenser region has a second flow section which can be flowed through by a second coolant, and wherein the heating and cooling module has a third flow section which can be flowed through by a refrigerant, wherein the evaporator region and the condenser region are arranged on a common base plate which has the fluid inlets and fluid outlets for the first coolant, the second coolant and the refrigerant, wherein the base plate has flow channels which can be flowed through by one of the coolants or the refrigerants, respectively, wherein the evaporator region and the condenser region are in fluid communication via the flow channels with the respective fluid inlets and the respective fluid outlets of the base plate.

A common base plate is particularly advantageous because on the one hand, it increases the stability of the entire heating and cooling module, and on the other hand, it is conducive to a compact design. It is particularly advantageous if at the same time, the base plate has the required fluid inlets and the required fluid outlets and also means that are suitable for guiding the refrigerant and the coolant to the respective heat transfer elements. Therefore, the base plate can replace a large number of connecting lines which would be necessary for fluid supply of the individual heat transfer elements. This also reduces the volume of fluid required, since the supply and discharge line distances are considerably shorter and therefore have a lower internal volume.

Furthermore, such a configuration also provides advantages in terms of the final assembly as the required installation space for the heating and cooling module can be lower since no additional supply and discharge lines are needed. In addition, the total weight of a heating and cooling module according to the invention is less than a structure with a plurality of individual heat exchangers.

In addition, an inventive heating and cooling module provides a modular structure, which allows for different configurations of various heat transfer elements to be mapped on a base plate. The heating and cooling module can thus be easily adapted to different requirements. Furthermore, a large number of identical components may be used. Overall, a higher flexibility is achieved by the structure according to the invention.

The third flow section can be traversed by a refrigerant. This flow section can extend along the entire heating and cooling module through several heat transfer elements. In particular, it extends through both the evaporator region and the condenser region. There, a heat transfer takes place between the refrigerant that flows through the third flow section, and either the first refrigerant or the second refrigerant.

It is furthermore particularly advantageous if on or in the base plate, a thermostatic expansion valve is disposed, which is flowed through by the refrigerant.

The expansion valve, which is used to expand the refrigerant, can be arranged preferably directly on or within the base plate. This further leads to a more compact structure and in addition, to a mechanical protection of the expansion valve due to the walls delimiting the base plate. The expansion valve is preferably again releasably integrated on or into the base plate.

A collector can be arranged on or in the base plate, which is used for collecting and/or storing and/or filtering and/or drying the refrigerant. A collector is particularly advantageous to compensate for variations in volume of the refrigerant over the operating time. Also, with a collector with filter means and/or desiccants, a preferably long, consistent quality of the refrigerant in the refrigerant circuit can be achieved.

An embodiment provides that an internal heat exchanger and/or a subcooling section can be arranged on the base plate, wherein the internal heat exchanger and/or the subcooling section are also in fluid communication with flow channels of the base plate and can be flowed through.

An internal heat exchanger is advantageous in order to achieve a further heat transfer between the refrigerant which has flowed through the evaporator region and the refrigerant which has flowed through the condenser region. Such an additional heat transfer additionally increases the efficiency of the heating and cooling module. A subcooling section is advantageous in order to achieve further cooling of the refrigerant below the condensation temperature. With a further cooled refrigerant, the overall efficiency can also be increased. In advantageous embodiments, both an internal heat exchanger and a subcooling section may be provided. Optionally, also, only one of the two heat transfer elements may be provided.

The fluidic connections to flow channels or line structures within the base plate are also advantageous in order to achieve a compact design of the heating and cooling module. By using the base as a connecting element and distribution element, the overall number of joints in the refrigerant circuit and the coolant circuit can be reduced, increasing the robustness of the system. The flow section flowed through by the refrigerant should preferably be connected only to the compressor of the refrigerant circuit.

Due to the compact design and the greatest measure of integration of the fluid circuits in the base plate and the heat transfer elements, switching elements, such as valves, are no longer necessary, so that the system becomes more robust and requires less maintenance.

Furthermore, the compact design allows for the heating and cooling module to be disposed in a particularly safe area, which in case of accident prevents damage to the heating and cooling module or at least significantly reduces the likelihood of damage. This is particularly advantageous if a combustible refrigerant is used.

The heating and cooling module can be used with R-134a, R-1234yf or other so-called low-pressure refrigerants. Among other things, propane can be provided for this purpose. Basically, however, the heating and cooling module can also be used for high-pressure refrigerants such as R-744. In this case, a so-called gas cooler is provided in the place of a condenser region.

The evaporator region and/or the condenser region and/or the internal heat exchanger and/or the subcooling section and/or the collector can be formed in a stacked-plate design by a succession of multiple stacked disk elements. Preferably, the aforementioned heat transfer elements are arranged in a stacked plate structure. This is advantageous for achieving a simple structure. Heat transfer elements produced in a stacked-plate design can be manufactured at low cost since a large number of identical parts can be used. Furthermore, they are easily scalable and thus can be adapted to the respective load that is to be expected.

Moreover, it is advantageous when the heat transfer elements placed on the base plate are arranged adjacent to each other on an outer surface of the base plate in a direction transverse to the stacking direction of one of the disk stacks.

A mutually adjacent arrangement on a common outer surface of the base plate is advantageous for achieving a compact design. At the same time, a mutual thermal insulation of the individual heat transfer elements can be achieved by the spacing. The arrangement on a common outer surface is advantageous because the supply and discharge lines can then also be arranged on a common outer surface. In addition, the space regularly available for such a heating and cooling module can overall be better utilized.

The condenser region and/or the evaporator region and/or the collector and/or the internal heat exchanger and/or the subcooling section can be formed by common disk elements, wherein the individual heat transfer elements are fluidly separated from one another by separating elements in the respective disk elements.

A heating and cooling module with common disk elements for the individual heat transfer elements can be advantageous, since the different heat transfer elements can be manufactured in one working step. To fluidly separate the individual heat transfer elements from one another in such a way that no undesired mixing of the coolants with one another or with the refrigerant takes place, separating elements are preferably provided in the interior of the common disk stack. In an advantageous development, thermal insulation elements can be provided within the common disk stack.

It is also expedient if the base plate has flow channels through which heat transfer elements that are not located directly adjacent to each other can be fluidly connected with each other.

Flow channels within the base plate are advantageous to fluidly interconnect heat transfer elements not directly adjacent to one another. The base plate can thus produce bypasses which allow for guiding the refrigerant and/or one or both of the coolants past the individual heat transfer elements in a targeted manner. In this way, the heat transfer resulting along the heating and cooling module can be influenced specifically between the individual heat transfer elements and particularly between the fluids.

In an embodiment, it is advantageous if the base plate is constructed in several parts, wherein the flow channels are arranged in the interior of the base plate and are outwardly covered by a covering element or a plurality of covering elements.

The base plate can be formed, for example, by a box-shaped structure, in which insertion elements are provided, through which the flow channels are formed in the interior of the base plate. The box-shaped structure can be closed fluid-tight by a cover element. In an advantageous design, the box-shaped structure, the insertion elements and the cover element can be permanently interconnected. In an alternative embodiment, the flow channels can also be produced by a machining process from a solid body. Afterwards, the flow channels can be closed by cover elements.

The base plate is constructed to perform a function which is modeled on the circuit boards in electrical circuits. It serves both as a supporting element for the heat transfer elements and additionally as a connection means which holds the flow channels on standby for producing a fluidic connection. Analog of a classical circuit board, the flow channels may also be formed in several levels within the base plate, or may extend along one of its outer surfaces.

The fluid inlets and the fluid outlets can be arranged on a common outer surface of the base plate. This is particularly advantageous in order to achieve a structure of the heating and cooling module that is as compact as possible and to allow for easy accessibility to the fluid inlets and fluid outlets in case of maintenance or repair.

The outer surface of the base plate comprising the fluid inlets and the fluid outlets can lie opposite the outer surface on which the heat transfer elements are arranged. This is particularly advantageous for achieving a compact construction of the heating and cooling module. In addition, in this way a direct passage of a fluid through the base plate into one of the heat transfer elements can be achieved without the need for the fluid to be additionally deflected. The pressure loss occurring in the heating and cooling module is reduced, whereby overall efficiency can be increased.

The individual heat transfer elements can be thermally insulated from each other. Thermal insulation can be advantageous to avoid unintentional heat transfers. In this way, the efficiency of the heating and cooling module can be improved.

An embodiment provides that the individual heat transfer elements have different external dimensions and/or a different internal volume. This is particularly advantageous in order to better adapt the individual heat exchangers to the occurring loads. The respective necessary heat transfer is hereby particularly relevant as a parameter for dimensioning. Through a needs-based adjustment of the internal volume, it can in particular be achieved that the amount of fluid circulating in the heating and cooling module is minimized.

It is also advantageous if the base plate has positioning elements which form a receiving area for at least one of the heat transfer elements. Positioning elements can be, for example, depressions and/or elevations which allow a positioning relative to the base plate of either an already pre-assembled heat transfer element or of the base plate of a heat transfer element in such a way, that a simplified alignment between the fluid ports of the base plate and the corresponding fluid ports of the respective heat transfer element is made possible. This simplifies the assembly as a whole, whereby cost can be saved.

According to an embodiment of the invention, it is advantageous if all components, other than a possible thermostatic expansion valve (TXV) and a possible filter, can be manufactured in a bulk soldering process. This may mean that the relevant components are completely soldered in a soldering process. If using a so-called orifice expansion valve, it can even be included in the soldering process.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
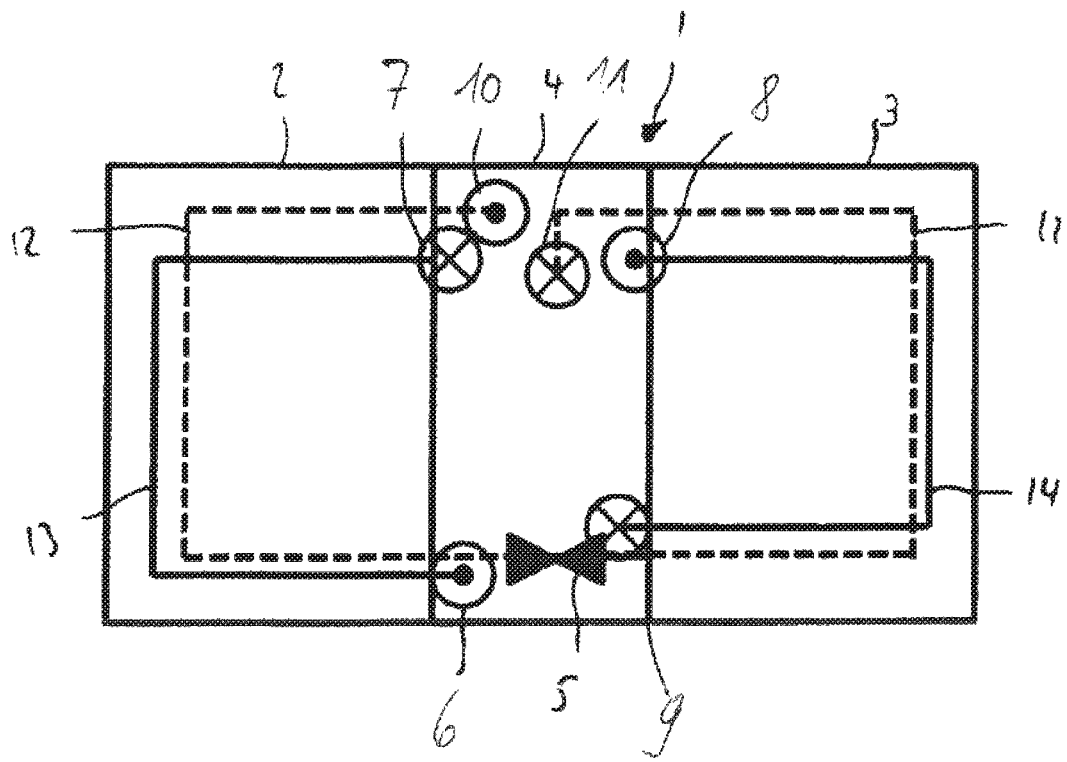
FIGS. 1 to 17 illustrate in each case a schematic view of a heating and cooling module, wherein in particular the different heat transfer elements and a selection of different arrangement sequences of the heat transfer elements on a common base plate are shown.

FIGS. 1 to 17 each show a schematic view of a heating and cooling module 1. All heating and cooling modules 1 shown each have a first fluid inlet 6 and a first fluid outlet 7 through which a coolant can flow into and out of the heating and cooling module 1. In particular, the condenser region 2 of the heating and cooling module 1 is flowed through. Furthermore, all heating and cooling modules 1 have a second fluid inlet 8 and a second fluid outlet 9 through which a coolant can also flow in and then out again, wherein mainly the evaporator region 3 of the heating and cooling module 1 is traversed by this coolant. Furthermore, all heating and cooling modules 1 have a third fluid inlet 10 and a third fluid outlet 11 through which a refrigerant can flow into and again out of the heating and cooling module 1. The refrigerant preferably flows through all areas 2, 3 of the heating and cooling module 1.

The flow section 13 indicates the flow path of the coolant in the condenser region 2. The flow section 14 indicates the flow path of the coolant within the evaporator region 3. Further, the flow section 12 indicates the flow path of the refrigerant between the third fluid inlet 10 and the third fluid outlet 11. The flow section 12 in this case runs evenly through the evaporator region 3 and the condenser region 2.

All FIGS. 1 to 17 each have an expansion valve designated by the numeral 5. Said valve is in each case integrated in the flow section 12 of the refrigerant and is arranged in each case on or in the heating and cooling module 1. This expansion valve 5 corresponds to a regular expansion valve, such as is used in refrigerant circuits in other solutions in the prior art. The expansion valve 5 can preferably be subsequently inserted into the heating and cooling module 1 and be bolted to or simply inserted into the heating and cooling module 1.

The heating and cooling module 1 has a plurality of heat transfer elements. These may be the evaporator region, the condenser region, the collector, the internal heat exchanger or a subcooling section.

Depending on the configuration of the heating and cooling module 1, at least one evaporator region and one condenser region are provided. The remaining heat transfer elements can be provided, however, need not necessarily be provided.

The schematic illustrations of FIGS. 1 to 17 show different arrangement principles of the individual heat transfer elements to one another. In addition, FIGS. 1 to 17 show in each case a possible configuration of the flow sections 12, 13 and 14 through the heating and cooling modules 1.

In preferred embodiments, the individual heat transfer elements may not be arranged in a common block as shown, but in individual sectors and spaced apart from each other. Preferably, the individual heat transfer elements are thereby arranged on a common base plate which forms a plurality of flow channels and further comprises the fluid inlets and fluid outlets for the coolant and the refrigerant. The base plate is shown, among other things, by the regions 4, 18 and 19, which are shown in FIGS. 1 to 17. Furthermore, the supply and discharge of coolant and/or refrigerant between the individual heat transfer elements is accomplished through the flow channels in the base plate. In advantageous embodiments, however, immersion sleeves or other pipes can be provided which can fluidly connect the individual heat transfer elements.

FIGS. 1 to 17 serve in particular to provide an overview of the possible configurations and, in particular, of the sequence of the individual heat transfer elements.

In the embodiment of FIG. 1, a condenser region 2 is arranged on the left side and an evaporator region 3 on the right side. The two regions 2, 3 are arranged spatially separated from one another, so that in FIG. 1, the view is of area 4 of the base plate. On this common base plate, the heat transfer elements are disposed. FIGS. 1 to 17 each show a plan view of the outer surface of the base plate having the heat transfer elements. The fluid inlets and the fluid outlets 6 to 11 are arranged in each case preferably on the outer surface of the base plate, facing away from the viewer.

In the embodiment of FIG. 1, the condenser region 2 is easily traversed in a U-shape. That is, there is no further deflection within the condenser region 2. Likewise, the evaporator region 3 is flowed through in a U-shaped loop, without further deflections. The refrigerant flows through the area 4, which is formed by the base plate, and flows through the right-hand evaporator area 3 in a U-shape. The expansion valve 5 is arranged downstream of the condenser region 2 within area 4 and is also arranged in the direction of flow of the refrigerant, upstream of the evaporator region 3. The condenser region 2 is also flowed through by the refrigerant in a U-shape. Thereafter, the refrigerant is discharged from the heating and cooling module 1 through the third fluid outlet 11.

The heating and cooling modules 1 shown in FIGS. 1 to 17 each have fluid inlets and fluid outlets 6 to 11, which are laterally attached to the heating and cooling module 1. These may preferably be arranged on a common external surface.

Figure 2:
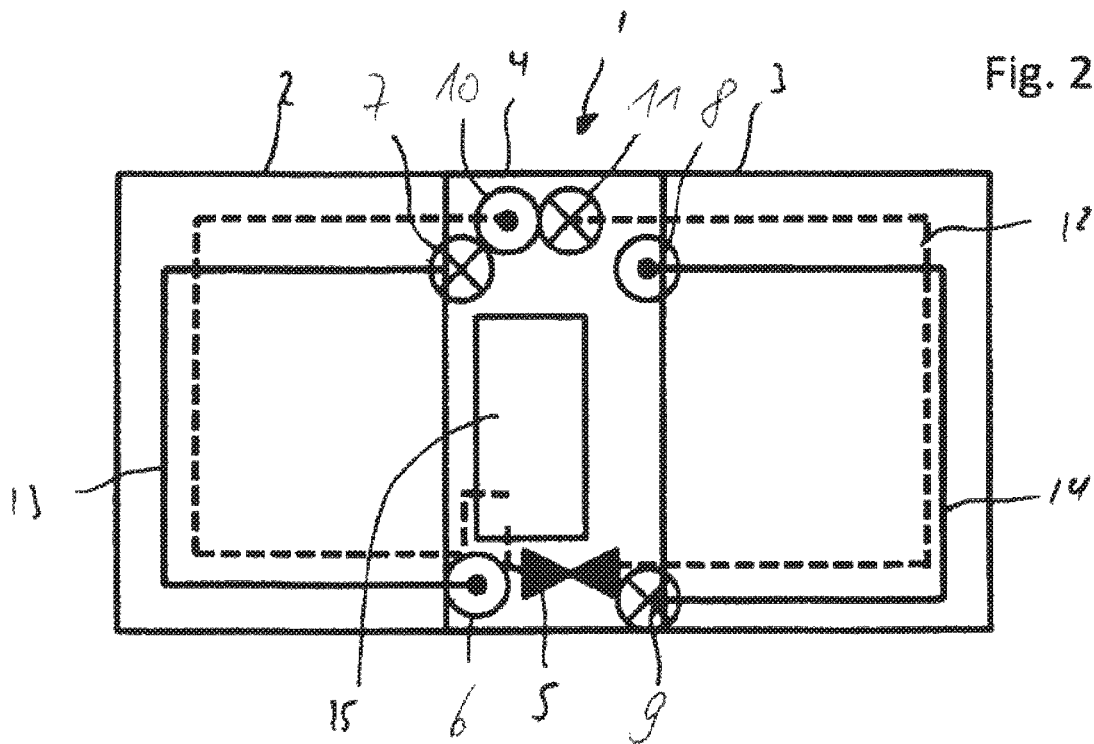

FIG. 2 shows an alternative embodiment of the heating and cooling module 1, wherein in addition, the base plate 4 is provided with a so-called collector 15, which is disposed upstream of the expansion valve 5 in the flow direction and is disposed downstream of the condenser region 2. The rest of the flow through the heating and cooling module of FIG. 2 corresponds to the embodiment of FIG. 1. The collector 15 is used in particular for the storage of refrigerant, and can thereby cause volume compensation. Means for drying and/or for filtering the refrigerant may be further provided in the collector 15.

Figure 3:
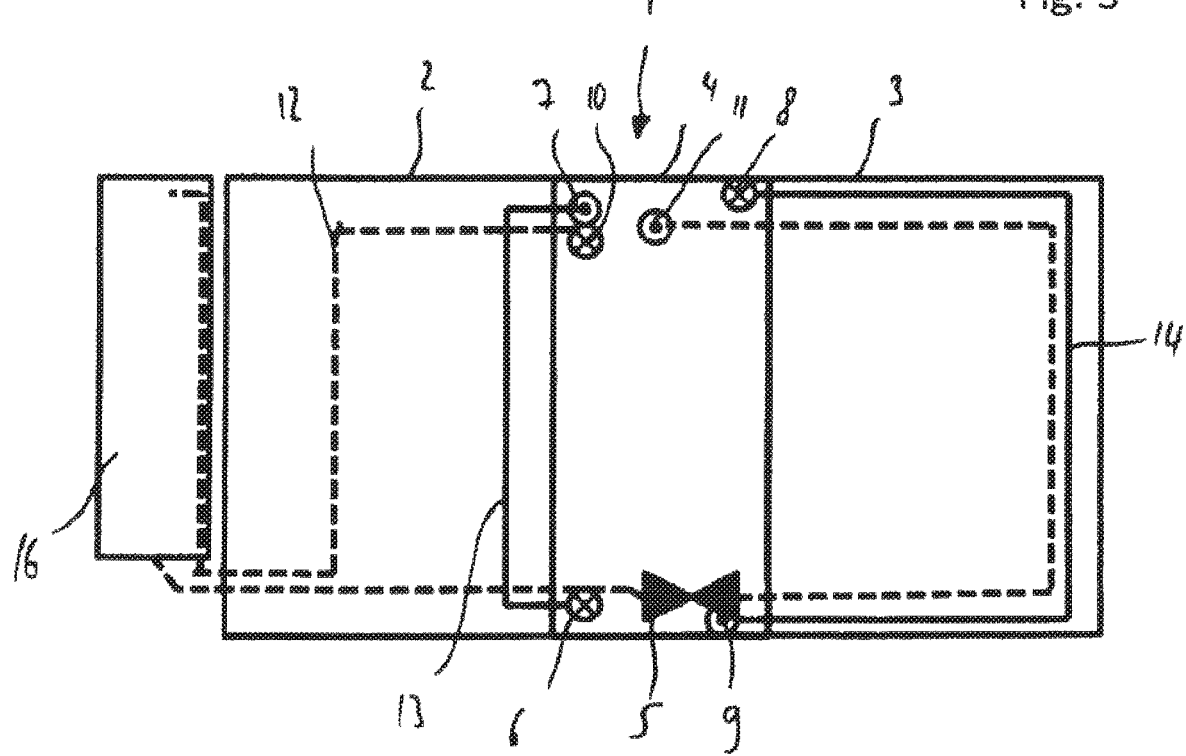

FIG. 3 shows a further alternative embodiment of a heating and cooling module 1. Here, an external collector 18 is disposed outside the heating and cooling module 1. Said collector is arranged adjacent to the condenser region 2. The external collector 16 is disposed upstream of the expansion valve 15 in the flow direction along the flow section 12, and downstream of condenser region 2. The condenser region 2 continues to be flowed through in a U-shape by a coolant; the evaporator region 3 is also flowed through in a U-shape by a coolant.

Figure 4:
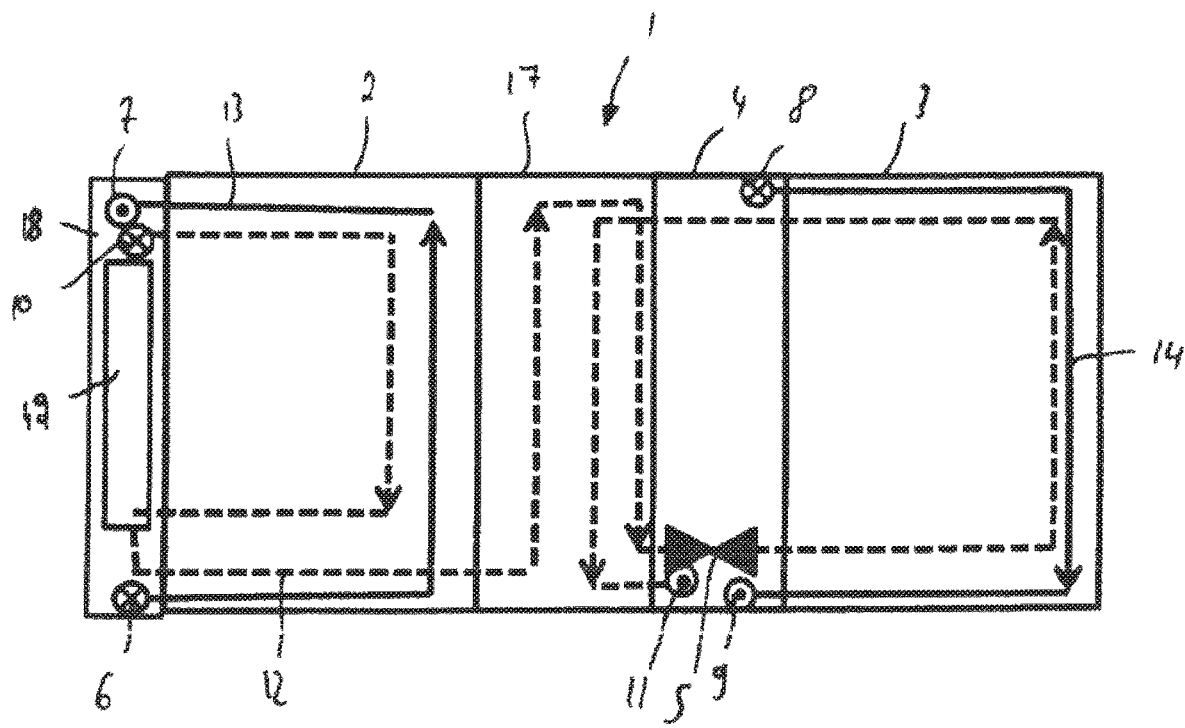

FIG. 4 shows a further alternative embodiment of a heating and cooling module 1 with a condenser region 2 and an evaporator region 3. Furthermore, an internal heat exchanger is realized in an area 17. In this internal heat exchanger 17, in particular a heat exchange between the refrigerant flowing out of the condenser region 2 and the refrigerant flowing from the evaporator region 3 can be achieved. To this end, the refrigerant is guided through the region 17 in several loops and with multiple deflections.

Further, a collector 15 is provided on the base plate. This is disposed in the region of the base plate designated by the numeral 18. Also, the third inlet 10, the first inlet 6 and the first outlet 7 are disposed in this area. The second inlet 8, the second outlet 9, the third outlet 11 and the expansion valve 5 are arranged respectively in the area of the base plate indicated by the reference numeral 4.

The condenser region 2 is flowed through in a U-shape by the refrigerant before it flows into the collector 15 arranged left of the condenser region 2. Finally, after exiting the collector 15 through a flow channel in the base plate, the refrigerant is guided into the internal heat exchanger 17. After the internal heat exchanger 17, the evaporator region 3 is flowed through in a U-shape by the refrigerant before the refrigerant is finally fed back into the internal heat exchanger 17 and is guided from there to the third fluid outlet 11 situated below.

Figure 5:
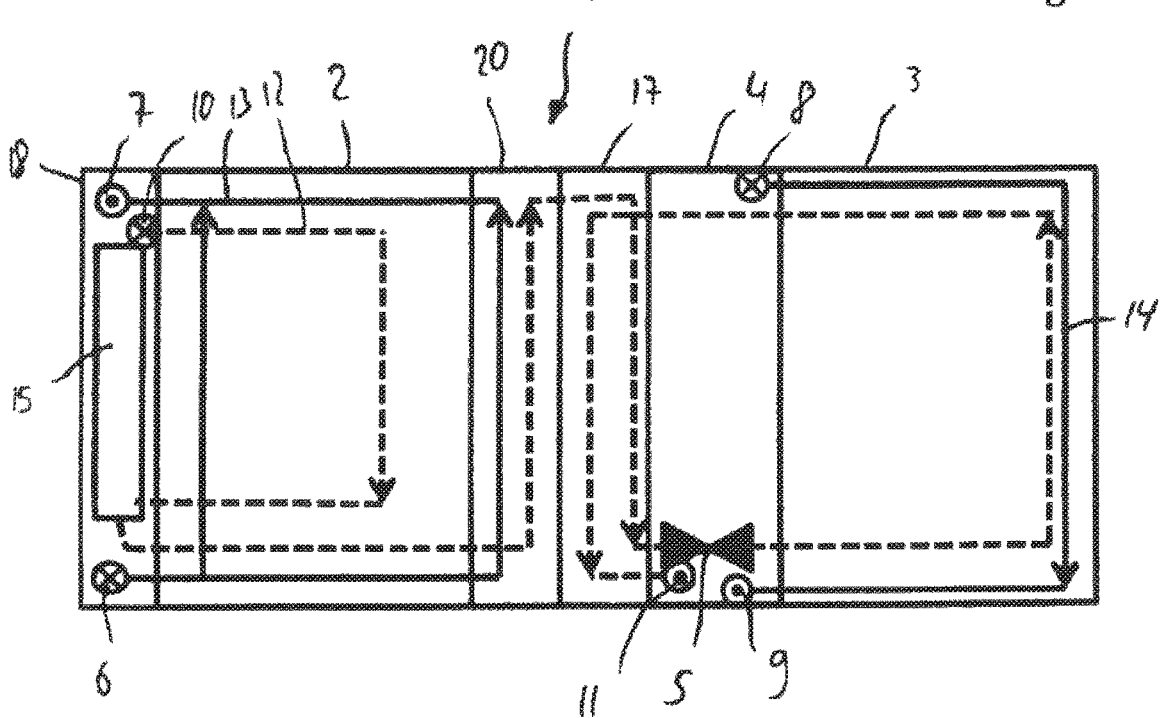

FIG. 5 shows an embodiment of the heating and cooling module 1, wherein a subcooling section 20 is disposed between the internal heat exchanger 17 and the condenser region 2. Also, an area of the base plate designated by the reference numeral 18 is shown to the left of the condenser region 2, at which a collector 15 is arranged. In addition to the internal heat exchanger 17, the subcooling section 20 is now also flowed through by the refrigerant and by the coolant of the condenser region 2. In this way, further cooling of the refrigerant is obtained in the subcooling section 20, thereby increasing the efficiency of the heating and cooling module 1 as a whole. The construction of the base plate in the area marked with the reference numeral 4 continues to correspond to the representation already shown in FIG. 4.

Figure 6:
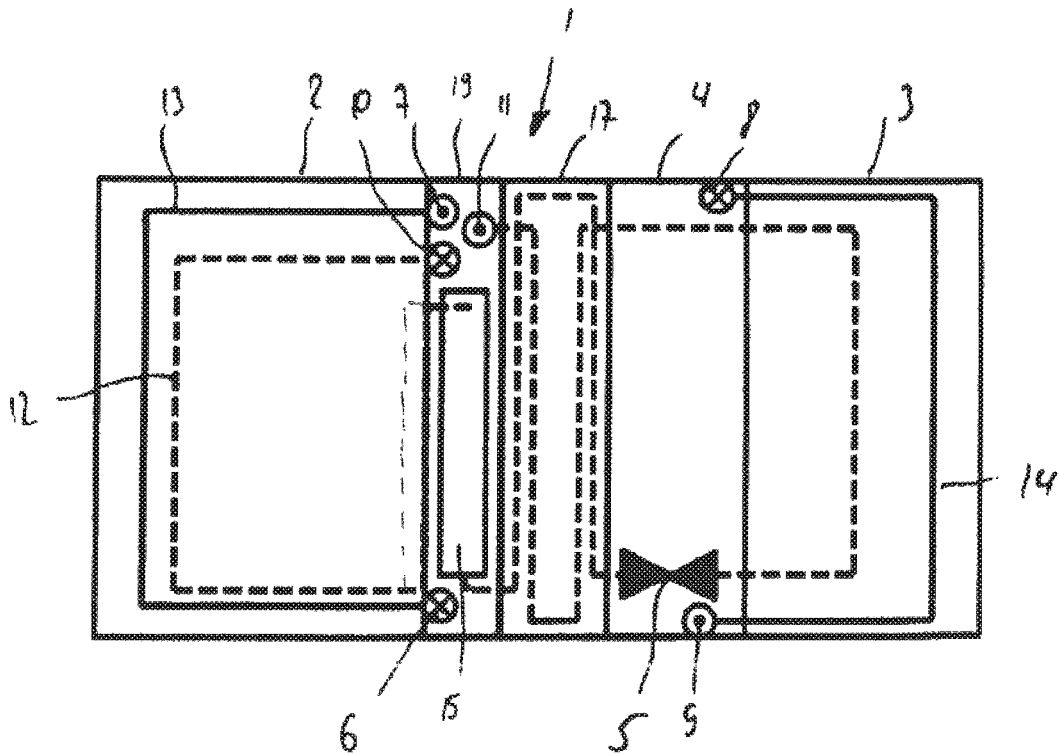

FIG. 6 shows an alternative arrangement of an evaporator region 3 at the right end with a juxtaposed area 4 of the base plate, a juxtaposed internal heat exchanger 17 and a further area 19 of the base plate having a collector 15. To the left of the area 19, the condenser region 2 is disposed. The refrigerant flows into the heating and cooling module in the area 19, and flows through the condenser region 2 in a U-shape before it flows into the collector 15. From the collector 15, the refrigerant ultimately flows into the internal heat exchanger 17 before it flows through the expansion valve 5 and flows into the evaporator region 3. Between the refrigerant flowing out from the evaporator region 3 and the refrigerant flowing out from the collector 15, a heat transfer is eventually achieved in the internal heat exchanger 17. The refrigerant then flows out through the third fluid outlet 11 from the heating and cooling module 1. The condenser region 2 and the evaporator region 3 are each flowed through in a U-shape without further deflection by the coolant.

Figure 7:
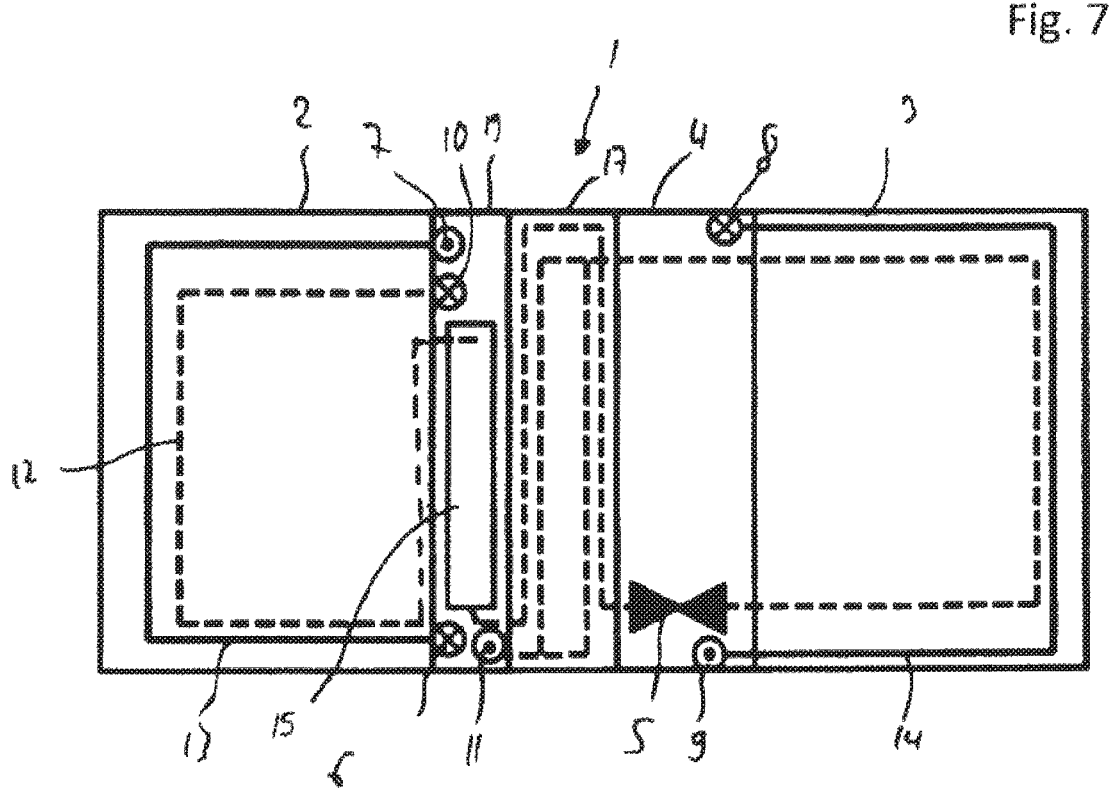

The embodiment of FIG. 7 largely corresponds to that of FIG. 6, but with the difference that the refrigerant flowing from the evaporator region 3 is guided in the internal heat exchanger 17 in two parallel flow paths from top to bottom, and is finally discharged from the heating and cooling module 1 through a third fluid outlet 11 disposed on the bottom.

Figure 8:
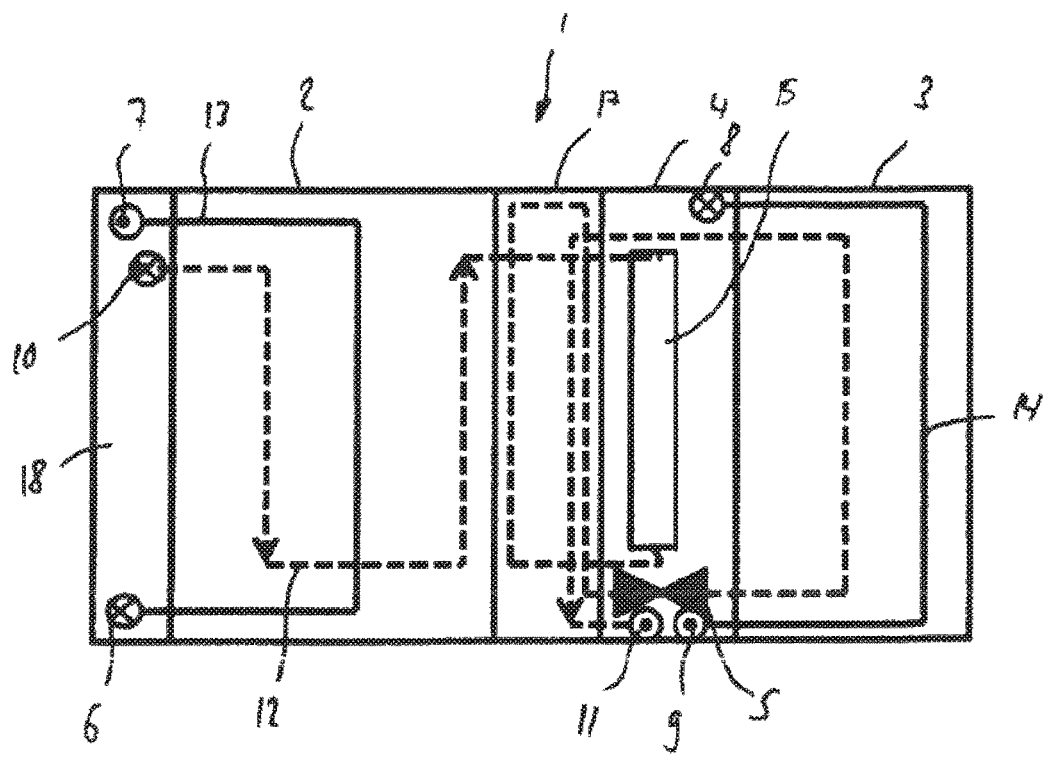

In the embodiment of FIG. 8, the collector 15 is disposed in area 4 of the base plate. Through this area 4, the coolant for the evaporator region 3 flows in via the second fluid inlet 8 and out via the second fluid outlet 9. To the left of the area 4, an internal heat exchanger 17 is arranged, in which the refrigerant of the condenser region 2 is brought into heat exchange with the refrigerant of the evaporator region 3. To the left of the condenser region 2, an area 18 of the base plate comprising the third inlet 10, the first inlet 6 and the first outlet 7 is disposed. The third inlet 10 is arranged at the upper end portion and the refrigerant flows through the condenser region in a U-shape from top to bottom and then back upward and in the upper region, passes through the internal heat exchanger 17 into the collector 15, which is arranged in the area 4. From there, the refrigerant in the lower region flows back into the internal heat exchanger 17 where it is deflected in a loop shape, and after having passed through an upper portion of the internal heat exchanger 17, flows back into the area 4 in the lower region and then into the expansion valve 5. The refrigerant then flows in a U-shape from the bottom upward through the evaporator region 3 and back into the internal heat exchanger 17 and there, from top to bottom towards the third fluid outlet 11.

Figure 9:
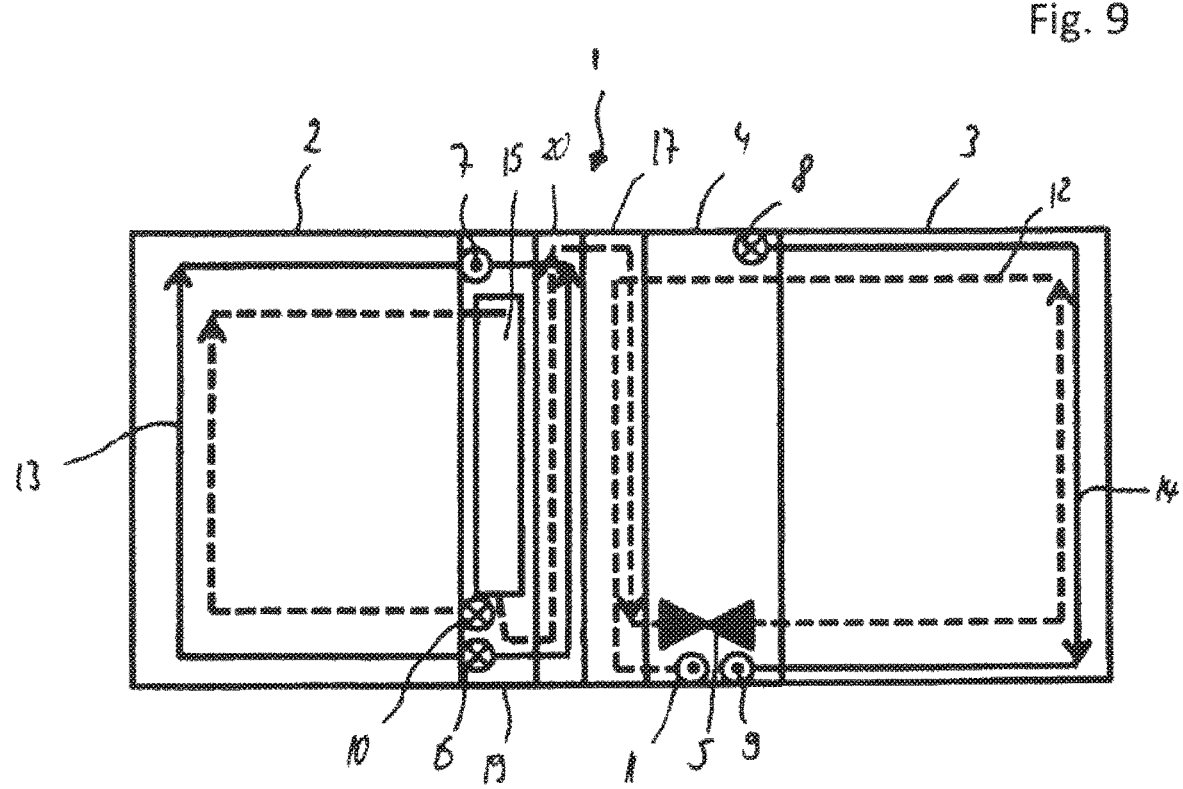

FIG. 9 shows an arrangement, wherein to the left of the area 4, an internal heat exchanger 17, a subcooling section 20 and an area 19 are arranged. In the left area 19, a collector 15 is also arranged. In the example of FIG. 9, the refrigerant flows through the third fluid inlet in the area 19 at the bottom and flows through the condenser region 2 in a U-shape before it enters the collector 15 at the top. From the collector 15, the refrigerant flows out at the lower end of the collector 15 and is finally guided out in the subcooling region 20 co-currently with the coolant of the condenser region 2, before it is transferred in the upper area into the internal heat exchanger 17 and, after deflection in the lower region, finally flows through the expansion valve 5 into the evaporator region 3. From the evaporator region 3, where it flows in a U-shape, it is ultimately guided back through the area 4 into the internal heat exchanger 17 and guided there from top to bottom towards the third fluid outlet 11 at the bottom. In this manner, a further heat transfer between the refrigerant and the coolant of the condenser region 2 is ensured in the subcooling region 20, and in the internal heat exchanger 17, a heat transfer between the refrigerant from the condenser region 2 and the evaporator region 3.

The coolant of the evaporator region 3 continues to be guided through said region in a U-shape. The coolant for the condenser region 2 is fed into the region 19 at a first fluid inlet 6 situated below and there, guided in two directions to the left and to the right, both into the internal heat exchanger 20 and into the condenser region 2. There, it flows upward respectively and finally flows out of the heating and cooling module 1 through the first fluid outlet 7 disposed in the upper end portion.

Figure 10:
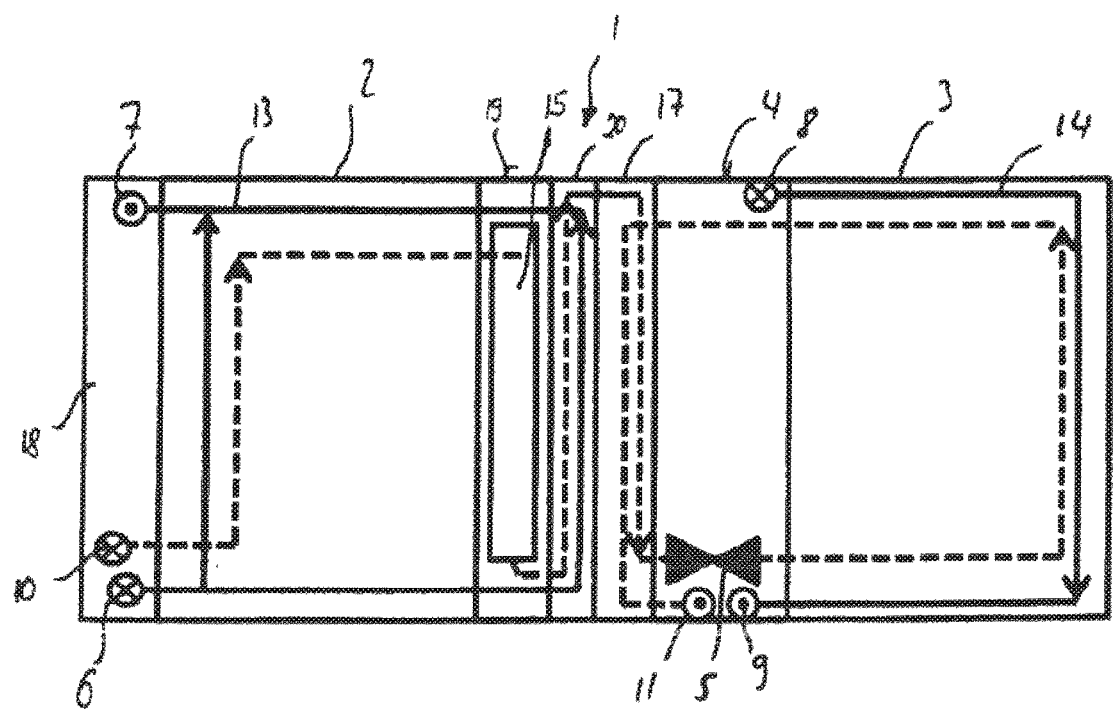

FIG. 10 shows a structure of a heating and cooling module 1 as it was already shown in FIG. 9. In addition, another area 18 is now located at the left end of the condenser region 2. Said other area carries the first inlet 6, the first outlet 7 and the third inlet 10. The remaining inlets and outlets 8, 9 and 11 are arranged in the area 4 to the left of the evaporator region 2. The third fluid inlet 10 is arranged in the lower region, whereby the refrigerant passes into the condenser region 2 in the lower end and there, flows upward, before it flows into the region 19 in the upper end, and into the collector 15 disposed thereon. At the lower end of the collector 15, the refrigerant exits and is passed upward, within the subcooling region 20 and co-currently with the coolant of the condenser region 2. There, it flows to the right into the internal heat exchanger 17, where it is again brought into a further heat exchange with the refrigerant which has already passed through the evaporator region 3. The refrigerant ultimately flows from the heating and cooling module 1 through the third fluid outlet 11 at the lower end. The arrangement of the third inlet 10 on the left side 18 can bring about a modified fluid flow within the condenser region 2. The coolant of the condenser region 2 is also supplied over the left area 18 at the bottom and there, flows upward both in the condenser region 2 as well as in the subcooling section 20. The coolant finally flows through a common flow section through the first fluid outlet 7 from the heating and cooling module 1.

Figure 11:
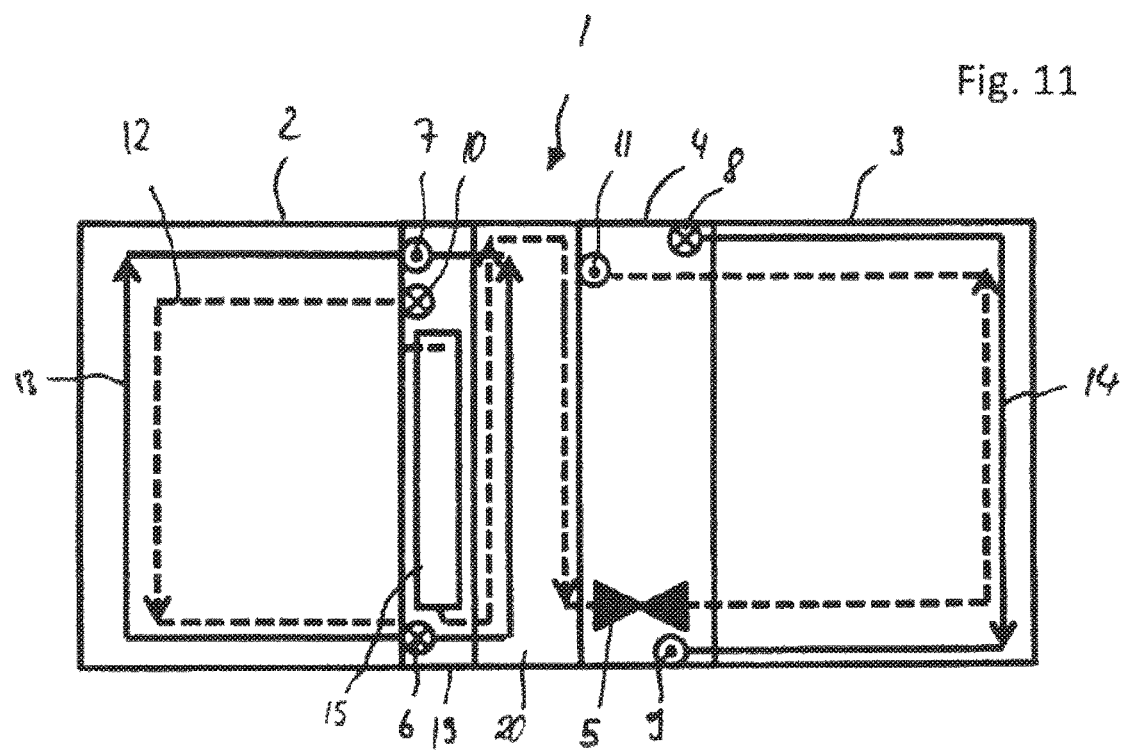

FIG. 11 illustrates an arrangement, which from the left comprises a condenser region 2, an adjacent area 19, an adjacent subcooling section 20, an area 4 and an evaporator region 3. On the left area 19, a collector 15 is also arranged, which is flowed through by the refrigerant from top to bottom. In the subcooling section 20, the refrigerant flowing out of the collector 15 is further brought into heat exchange with the coolant of the condenser region 2. For this purpose, the refrigerant flows at the top, through the third inlet 10 in the area 19, into the heating and cooling module 1, where it is looped through the condenser region 2 so that it can enter the upper end of the collector 15. The refrigerant is finally also guided through the evaporator region 3 in a U-shape and exits the heating and cooling module 1 at an upper, third fluid outlet 11.

Figure 12:
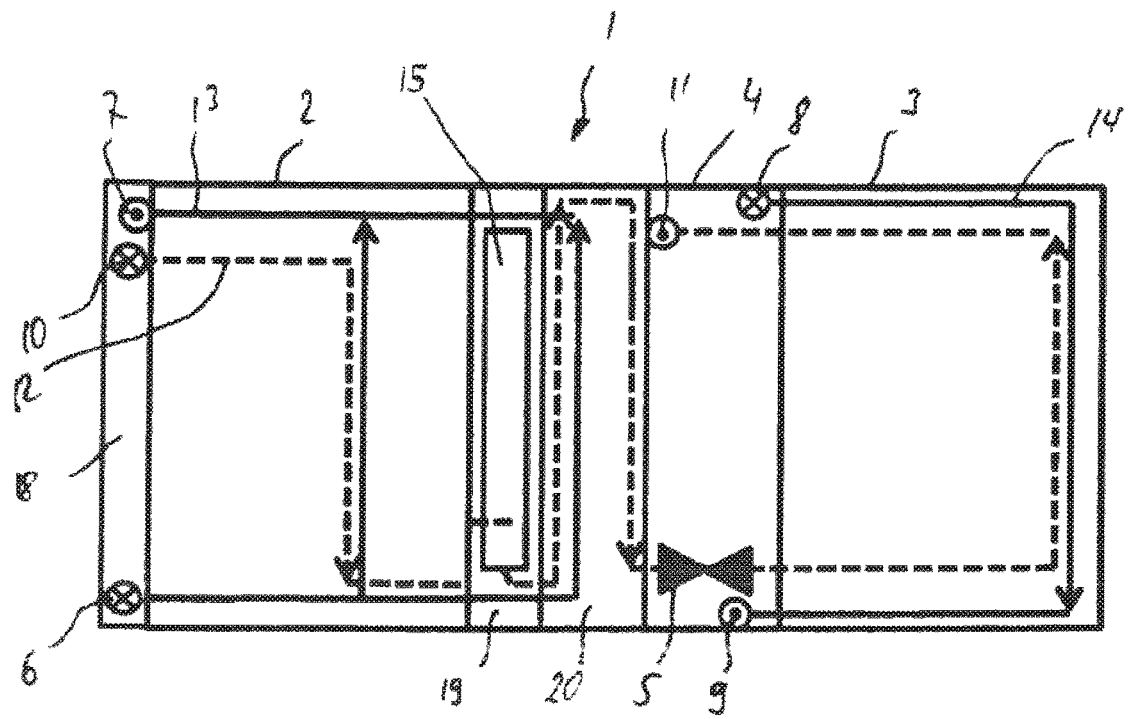

FIG. 12 shows an arrangement according to FIG. 11, with the difference that a further area 18 is disposed on the left end of the condenser region 2. This carries the third fluid inlet 10, the first fluid inlet 6 and the first fluid outlet 7. Analog of FIG. 10, by this additional area 18, a modified fluid flow, in particular for the refrigerant along the flow section 12, is made possible within the heating and cooling module 1. The refrigerant is not looped in the condenser region 2, but enters at the upper end of the heating and cooling module 1, and flows within the condenser region 2 from top to bottom and from there, into the collector 15. Also, since a subcooling section 20 is also provided in FIG. 12, the coolant of the condenser region 2 is both guided within the condenser region 2 from bottom to top and in the subcooling region 20. Both fluid flows are then discharged from the heating and cooling module 1 through a common flow section from the first fluid outlet 7.

Figure 13:
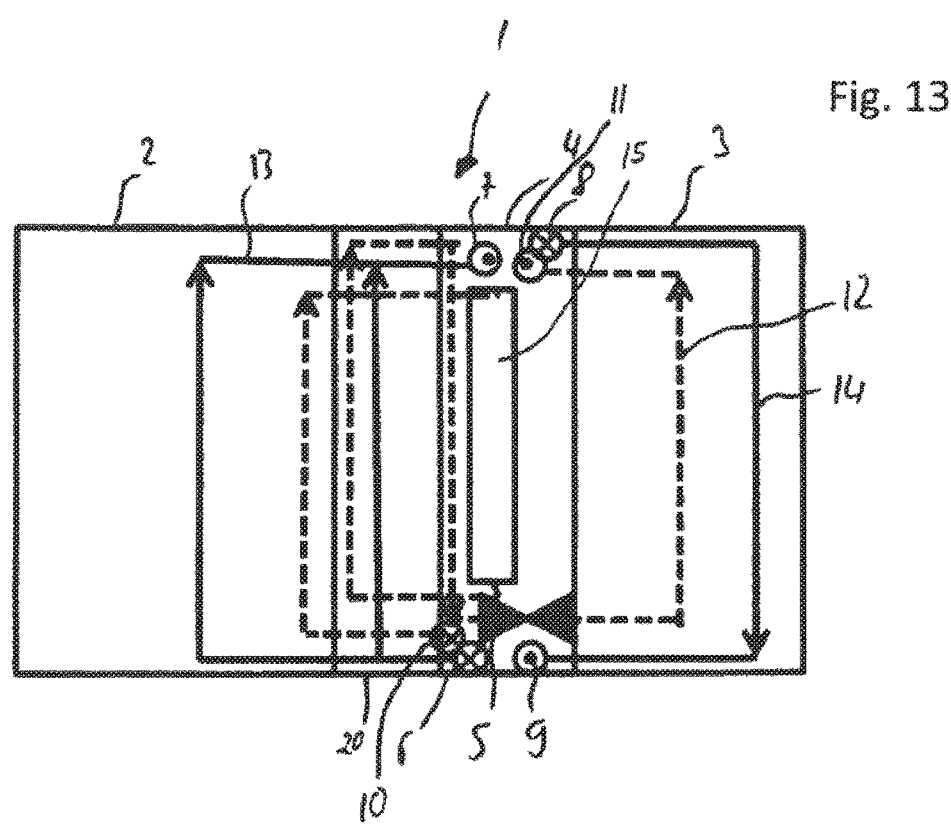
Figure 14:
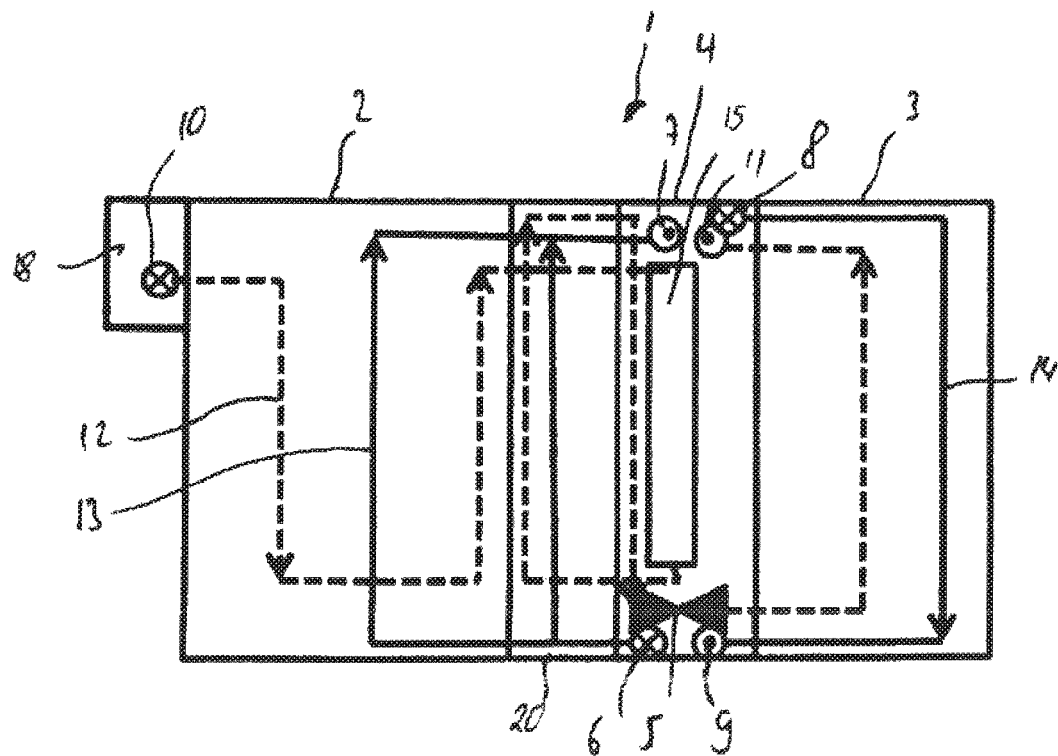
Figure 15:
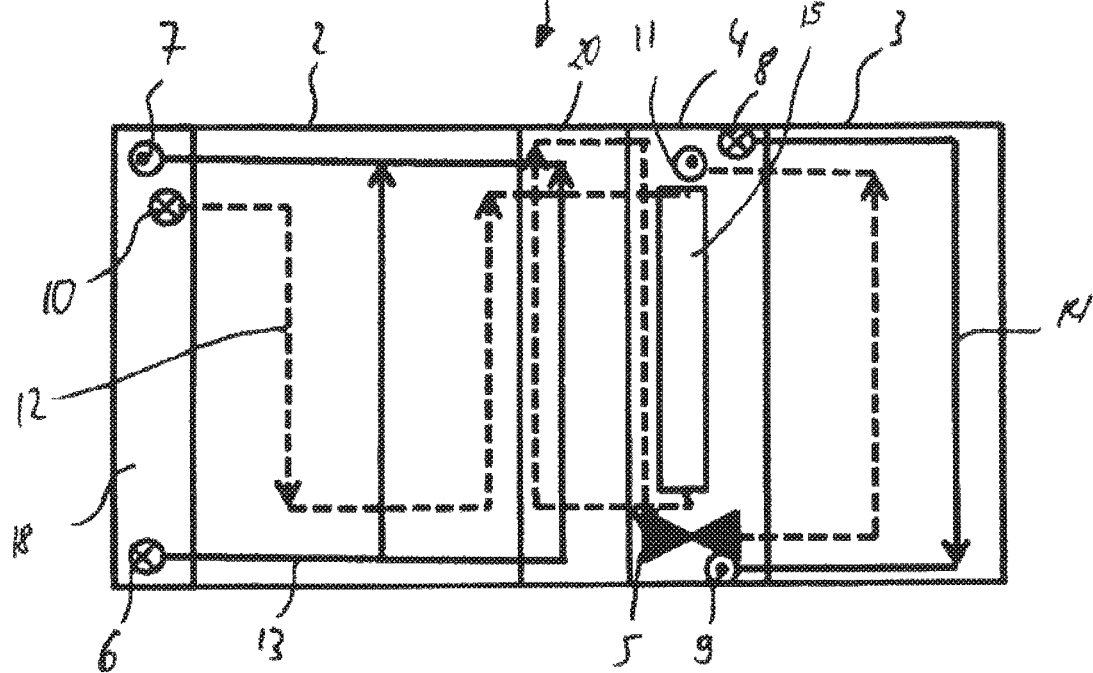

The following FIGS. 13, 14 and 15, respectively, have a condenser region 2 on the left, to which a subcooling section 20 connects to the right, and further to the right, an area 4, on which a collector 15 is arranged. To the right, an evaporator region 3 is arranged. In the example of FIG. 13, the fluid inlets and fluid outlets 6 to 11 are completely disposed within the area 4. Within the subcooling section 20, a heat transfer takes place between the refrigerant and the coolant of the condenser region 2. The refrigerant particularly flows in at the lower end portion of the area 4 and there, flows through the subcooling region 20 into the condenser region 2; from there, at the upper end, the refrigerant flows back into the area 4 and into the collector 15. From the lower end of the collector 15, the refrigerant flows through the expansion valve 5 at the bottom end of the heating and cooling module 1 into the evaporator region 3, where it flows upward and eventually flows out of the heating and cooling module 1 at an upper third fluid outlet 11. The coolant for both the condenser region 2 as well as for the evaporator region 3 are each guided in a simple U-shaped form along the flow sections 13 and 14 through the heating and cooling module 1.

FIG. 14 shows a structure analogous to FIG. 13, wherein additionally at the left end, an area 18 extending at least over a partial area of the height of the heating and cooling module 1 is provided. In said area, in particular, the third fluid inlet 10 is provided. The other fluid inlets and fluid outlets 6 to 9 and 11 are arranged in the area 4 on the right. Through the third inlet 10 in the area 18, a different flow of the refrigerant within the heating and cooling module 1 results. At the upper end, the refrigerant flows into the condenser region 2 and then downwardly and then back up again in a U-shape, before it flows through the subcooling section 20 into the upper end of the collector 15. From there, the refrigerant flows through the lower end of the heating and cooling module 1 back into the subcooling section 20 and there enters in a heat exchange with the coolant of the condenser region 2. Finally, the refrigerant flows upward and at the upper end to the right, into the area 4, where it flows downward and passes through the expansion valve 5 into the evaporator region 3. There, it flows back to the upper end of the heating and cooling module 1 and finally through the third fluid outlet 11 in the area 4 out of the heating and cooling module 1.

FIG. 15 shows a similar structure, wherein left of the condenser region 2, an area 18 is arranged over the full height of the heating and cooling module 1. In the area 18, in particular the first fluid inlet 6, the third fluid inlet 10 and the first fluid outlet 7 are arranged. The flow through the heating and cooling module 1 is mostly analog to the embodiment shown in FIG. 14. Only the flow of the refrigerant through the condenser region 2 along the flow section 13 deviates in that the coolant only flows in a U-shape from the left area 18 through the lower area of the heating and cooling module 1 into the condenser region 2 and into the subcooling section 20, and there, flows upward and flows out of the first fluid outlet 7 at the top in a common fluid flow.

Figure 16:
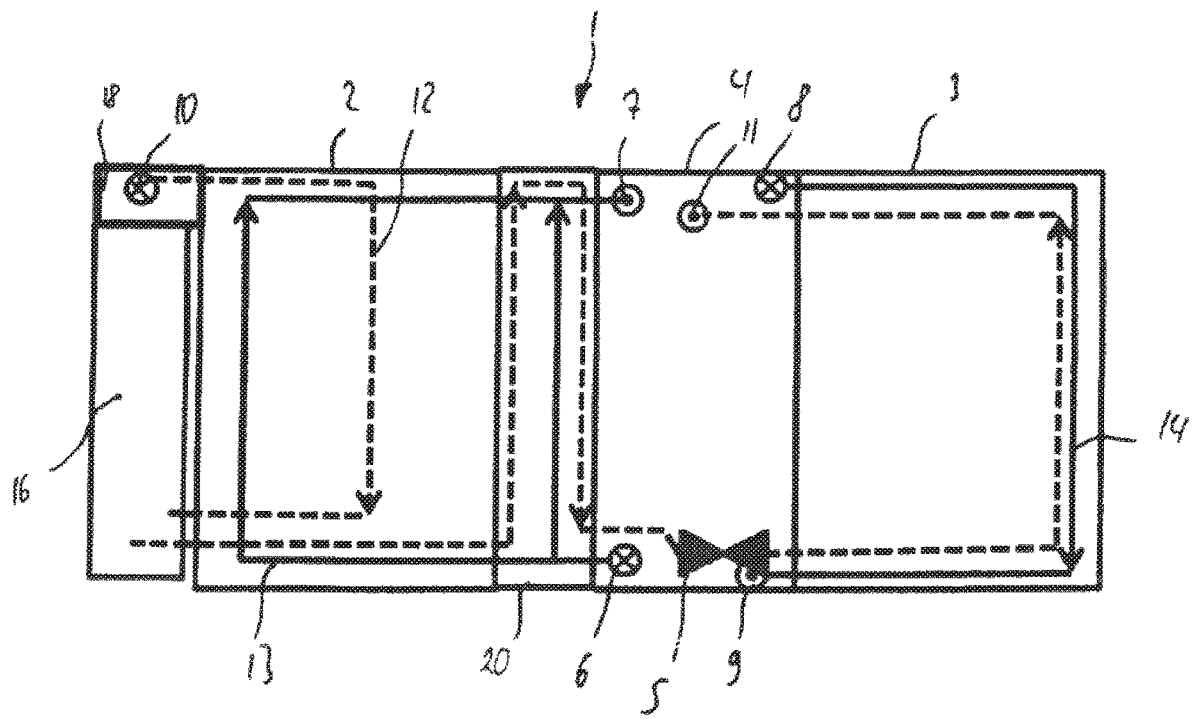

FIG. 16 shows an embodiment, wherein to the left of the condenser region 2, an external collector 16 is provided and further, an area 18 extending at least over a partial area in height, which is arranged at the upper end of the heating and cooling module 1.

In FIG. 16, the refrigerant is flowed into the heating and cooling module 1 through the third fluid inlet 10 located at the top in the left area 18 and there, flows into the condenser region 2 at the upper end. There, the refrigerant flows back down and to the left into the external collector 16. There, the refrigerant flows through the collector 16 and at the condenser region 2, finally flows past the lower end of the collector 16 into the subcooling section 20 where it flows upward and is deflected in a U-shape and then again flows downward. There, a heat transfer takes place with the coolant of the condenser region 2.

At the lower end, the refrigerant is passed into the area 4 on the right before it flows through the expansion valve 5 into the evaporator region 3, where it flows back upward in a U-shape and finally to the left, back into the area 4. The refrigerant then flows out through the third fluid outlet 11 at the upper end of the heating and cooling module 1. The coolant for the condenser region 2 enters in the area 4 on the right at the lower end, where it is distributed in the subcooling section 20 and in the condenser region 2, where it flows upward and flows back to the right into the area 4 via a common flow section where it flows out at the upper, first fluid outlet 7.

Figure 17:
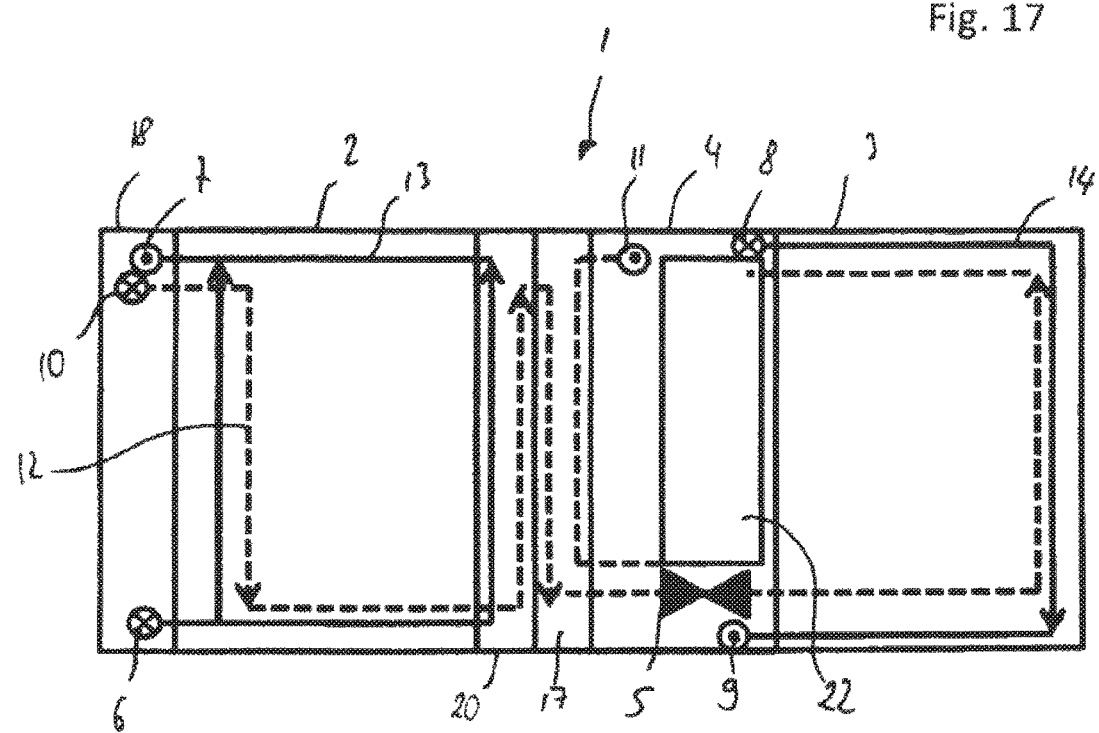

FIG. 17 shows another embodiment, wherein from the left, an area 18 is arranged having the first fluid inlet 6, the first fluid outlet 7 and the third fluid inlet 10; to its right, a condenser region 2 is arranged; to its right, a subcooling section 20; to its right, an internal heat exchanger 17; to its right, an area 4 and to its right, finally an evaporator region 3. The refrigerant flows in at the top of the area 18 on the left, into the heating and cooling module 1, and finally flows to the right into the condenser region 2, where it flows downward and at the lower end, flows into the subcooling section 20. There, the refrigerant is diverted upwards, where a heat transfer takes place with the refrigerant of the condenser region 2. At the upper end, the refrigerant is transferred to the internal heat exchanger 17 on the right, where it flows downward and finally flows to the right through the area 4 and through the expansion valve located therein, into the evaporator region 3 on the right. There, it is guided upwards in a U-shape and finally at the upper rear, to the left, where it flows into the collector 22 within the area 4. At the lower end of the collector 22, the refrigerant eventually flows out and back into the internal heat exchanger 17, where it finally flows upward and to the right, back into the area 4, and is discharged from the third fluid outlet 11 in the upper end of the heating and cooling module 1.

The coolant of the condenser region 2 is flowed into the lower end of the left area 18 and in two mutually parallel flow sections, flows upwards in both the subcooling region 20 and in the condenser region 2, and there, is guided via a common flow section to the first fluid outlet 7 situated above.

The collector 22 shown in FIG. 17 is a low-pressure collector, which is flowed through by a refrigerant of low pressure. For this purpose, a pressure reducing element can in particular be provided, which may be represented, for example, by a cross-sectional tapering of the flow section.

FIGS. 1 to 17 each show only a schematic representation of the flow through the heating and cooling module 1. In particular, several deflections may be provided in alternative embodiments which lead to an improved circulation of the refrigerant or coolant within the heating and cooling module 1. Also, the flow directions of the coolant or of the refrigerant can be reversed in alternative embodiments, so that areas flowing co-currently with each other are thereby traversed to each other in a countercurrent, whereby the heat transfer can be improved.

FIGS. 1 to 17 show, in particular, only a schematic representation, whereby, however, the solution area with regard to the choice of material, the dimensions and the arrangement of the elements to each other is not restricted. In particular, the different possibilities of sequencing the individual areas, such as the condenser region, the internal heat exchanger, the subcooling section, the collector and the evaporator region, are not limited by the embodiments in FIGS. 1 to 17. FIGS. 1 to 17 merely show one non-exhaustive selection of possible arrangements.

The representations of FIGS. 1 to 17 each show a plan view of the outer surface of the base plate on which the heat transfer elements are disposed. The base plate can also extend further across the heat transfer elements. In FIGS. 1 to 17, the base plate is divided multiple times into different areas 4, 18 and 19. These areas are all in fluid communication via one or more flow channels inside the base plate, whereby a fluid conduit over the entire length and width of the heating and cooling module can be achieved. The fluid conduit from one heat transfer element to another heat transfer element preferably runs through the common base plate. In alternative embodiments, however, immersion sleeves and/or tubes can also be provided, which can be run directly through one of the other heat transfer elements.

In the view of FIGS. 1 to 17, the areas referred to as upper or lower each correspond to the upper end portion of the heating and cooling module 1 and the lower end portion of the heating and cooling module 1. This direction data, however, refers only to the relative position of the heating and cooling module 1 and does not constitute absolute directions.

Figure 18:
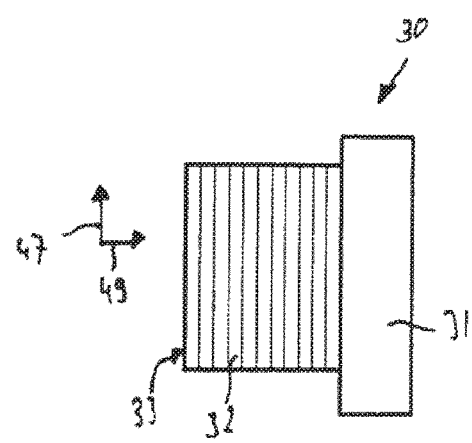
FIG. 18 is a schematic view of a heating and cooling module according to the invention, wherein in particular a possible orientation of the heating and cooling module is shown in the installed position.

FIG. 18 shows a view of an inventive heating and cooling module 30. The heating and cooling module 30 is formed by a base plate 31 on which one or more heat transfer elements are disposed. In FIG. 18, a condenser region 33 is arranged on the base plate 31, said region being constructed in a stacked-plate construction of a plurality of disk elements 32. FIG. 18 further illustrates the spatial directions 47 and 49, which are mutually at a right angle. The spatial direction 47 in this case indicates an orientation in which the heating and cooling module 30 is preferably mounted in the installation position. Direction 47 is thereby oriented from the bottom upwards.

Figure 19:
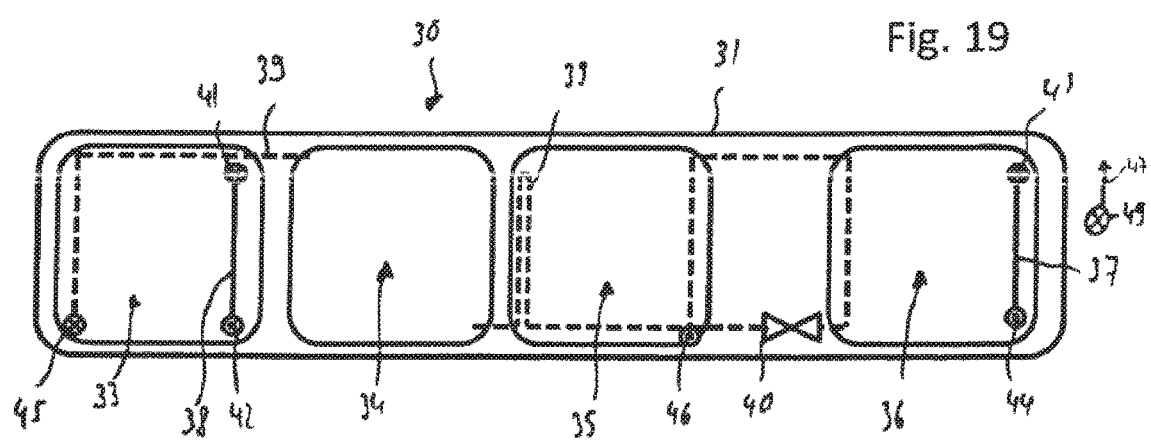
FIG. 19 is a schematic side view of a heating and cooling module with an evaporator region, a condenser region, a collector and an internal heat exchanger.

FIG. 19 shows a side view of the heating and cooling module 30, wherein the view of the observer is directed along the spatial direction 49.

From left to right, a condenser region 33, a collector 34, an internal heat exchanger 35 and an evaporator region 36 are juxtaposed on the base plate 31 of the heating and cooling module 30. The individual areas 33, 34, 35 and 36 in each case are spaced apart from one another, arranged along the common base plate 31.

The base plate 31 has a first fluid inlet 41, first fluid outlet 42, a second fluid inlet 43, a second fluid outlet 44, a third fluid inlet 45 and a fourth fluid outlet 46. Through the fluid ports 41, 42, in particular, a coolant may be passed through the condenser region 33. Through the fluid ports 43, 44, a second coolant can be passed through, in particular, the evaporator region 36. The fluid ports 45, 46 serve to supply and discharge a refrigerant, which may flow through a plurality of the heat transfer elements 33, 34, 35 and 36, of the heating and cooling module 30.

The actual function of the fluid inlet or the fluid outlet is hereby particularly dependent on the direction of conveyance of the coolant or the refrigerant. That is, in contrast to the afore-mentioned definition, a fluid inlet can also act as a fluid outlet, and vice versa.

The fluid ports 41 to 46 are all arranged in the common base plate 31. Preferably, these are arranged on a common outer surface of the base plate 31. This particularly makes connecting the heating and cooling module 30 to connection cables especially easy.

In the embodiment of FIG. 19, the refrigerant can in particular pass through the condenser region 33 and flow from there into the collector 34. From the collector 34, the refrigerant can flow into the internal heat exchanger 35, where it is brought in particular to a heat transfer with the refrigerant, which has flowed through the evaporator region 36 disposed downstream of the internal heat exchanger 35. From there, from the internal heat exchanger 35, the refrigerant can flow out from the base plate 31 of the heating and cooling module 30. In the flow section 39 of the refrigerant, an expansion valve 40 is arranged in the area between the internal heat exchanger 35 and the evaporator region 36. This expansion valve 40 is preferably part of the base plate 31.

The base plate 31 has a plurality of flow channels which in particular bring about the fluid transmission between the individual heat transfer elements 33, 34, 35 and 36. The individual heat transfer elements 33 to 36 are thereby fluidly connected to the respective flow channels of the base plate 31 via openings which face the base plate 31 so that the individual heat transfer elements 33 to 36 can be flowed through.

Figure 20:
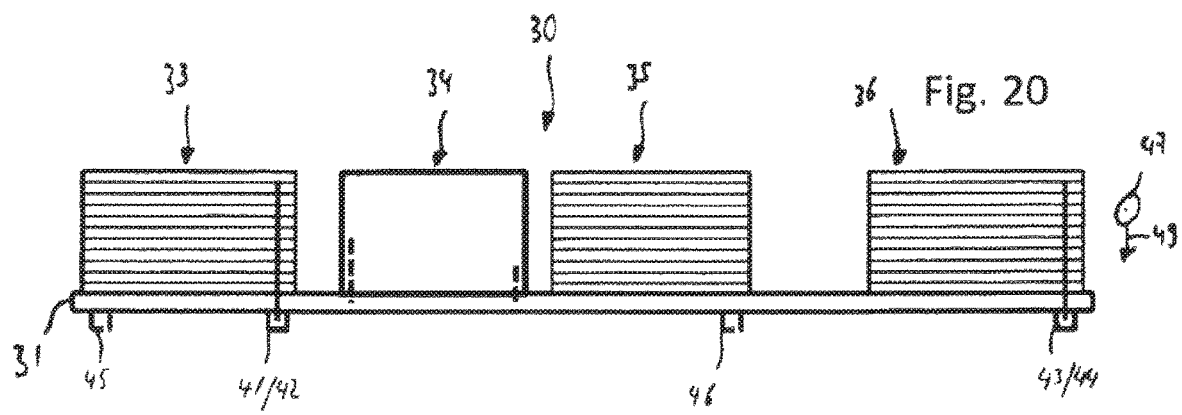
FIG. 20 is a plan view of the heating and cooling module shown in FIG. 19.

FIG. 20 shows a view from above on the heating and cooling module 30, counter to the direction in space 47. As indicated in FIG. 19, the heat transfer elements 33 to 36 are disposed spaced from one another on a common surface of the base plate 31. As can be seen in the representation of FIG. 20, in particular the condenser region 33, the internal heat exchanger 35 and the evaporator region 36 are formed in the stacked-plate design by stacking a plurality of disk elements. The fluid ports 41 to 46 are arranged on a common outer surface of the base plate 31. The fluid ports 41 and 46 may be formed in particular by connecting flanges, to which connection cables can be connected in a simple way. The connecting cables can be connected advantageously via releasable connections. This can be done preferably without the aid of tools. The flow through the individual heat transfer elements 33 to 36 can thereby be achieved by a variety of different configurations of the individual elements 33 to 36. To this end, different flow channels and flow sections may be formed within the individual heat transfer elements 33 to 36.

Figure 21:
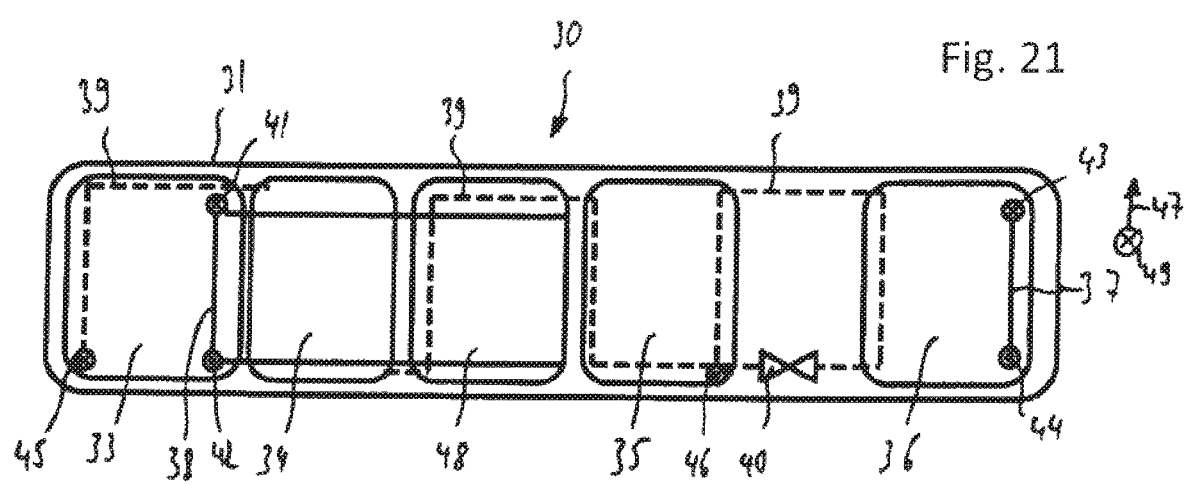
FIG. 21 is a schematic side view of an alternative embodiment of a heating and cooling module, with an evaporator region, a condenser region, a collector, an internal heat exchanger and a subcooling section.

FIG. 21 shows a view of a heating and cooling module 30 in an orientation corresponding to the one shown in FIG. 19. On the common base plate 31, from the left, a condenser region 33, a collector 34, a subcooling section 48, an internal heat exchanger 35 and an evaporator region 36 are arranged next to each other, respectively. In FIG. 21, the condenser region 33, as in the preceding FIG. 19 and in the subsequent Figures, is flowed through by a first coolant through the fluid ports 41, 42, along the flow section 38. Likewise, the evaporator region 36, as in the preceding and following figures, is flowed through by a second coolant through the fluid ports 43, 44, along the flow section 37.

In contrast to FIG. 19, the flow section 38 has an additional loop originating from the condenser region 33, which is guided past the collector 34 to the subcooling section 48 within the base plate 31. In this manner, a further heat transfer between the coolant which has flowed through the condenser region 33, and the refrigerant flowing along the flow section 39 through the heat transfer elements 33, 34, 35, 36 and 48 and through the base plate 31, is possible in the subcooling region 48.

The individual elements on the base plate 31 are also arranged spaced from one another, wherein in particular, an expansion valve 40 is also arranged between the internal heat exchanger 35 and the evaporator region.

Figure 22:
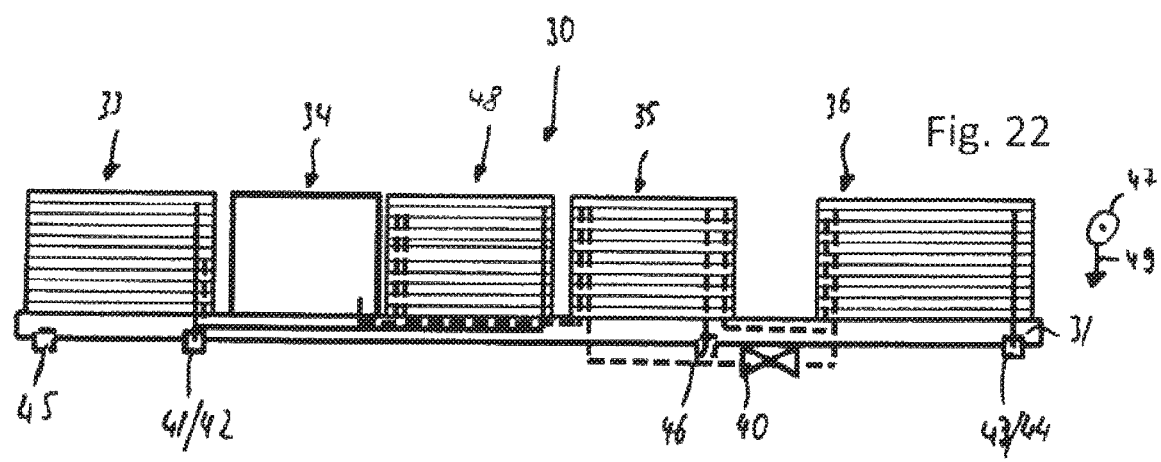
FIG. 22 is a plan view of the heating and cooling module according to FIG. 21.

FIG. 22 shows a view from above according to the viewing direction of FIG. 20 onto the heating and cooling module 30. In FIG. 22, all heat transfer elements 33, 48, 35 and 36 except for the collector 34 are composed of individual disk elements in a disk stack design.

In FIGS. 21 and 22, it can be seen in particular that the refrigerant is passed from the condenser region 33 into the adjacent collector 34, from where said refrigerant is passed through the base plate 31 into the subcooling section 48. There, as mentioned above, it causes a renewed heat transfer with the coolant of the condenser region 33. From the subcooling section 48, the refrigerant is routed into the internal heat exchanger 35, where a heat transfer with a proportion of the coolant, which has already passed through the evaporator region 36, is achieved. As in the previous figures, the flow channels in the base plate 31 are formed such that a fluid conduit shown in the embodiment of FIG. 22 is made possible. In FIG. 22, as in the previous and subsequent figures, the expansion valve 40 is arranged preferably within the base plate 31 or directly adjacent to the base plate 31.

Figure 23:
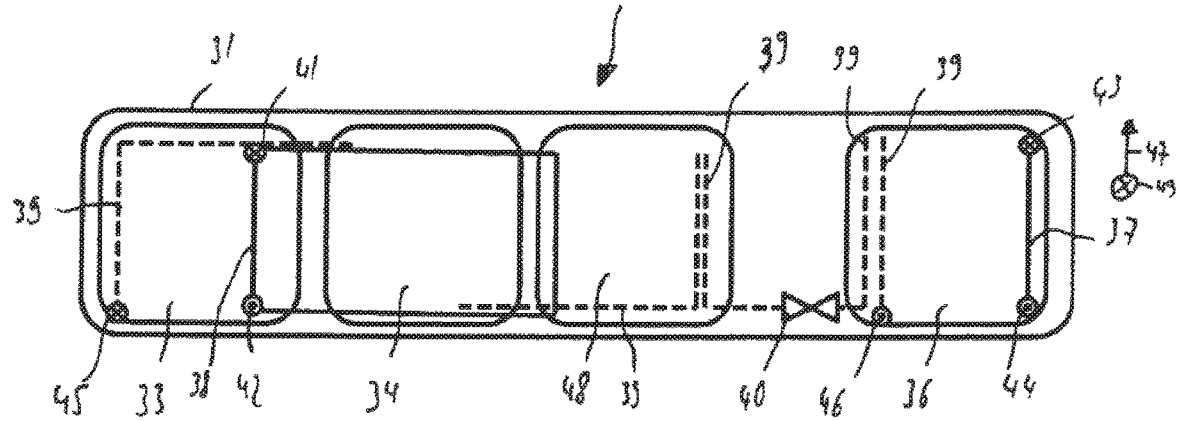
FIG. 23 is a schematic side view of an alternative embodiment of a heating and cooling module, with an evaporator region, a condenser region, a collector and a subcooling section.

FIG. 23 shows a view according to the viewing direction of FIG. 21 of a heating and cooling module 30 on which a condenser region 33 is arranged, next to a collector 34, a subcooling region 48 and an evaporator region 36. The condenser region 33 is flowed through by a first coolant along the flow section 38. The coolant is further guided to the subcooling section 48 via a loop which is formed by flow channels in the base plate 31. Analog to FIG. 21, the subcooling section 48 is also traversed by this coolant.

The refrigerant flows successively through the condenser region 33, the collector 34, the subcooling section 48 and the evaporator region 36. There, a heat exchange takes place between the refrigerant and the first and the second coolant, analog to the embodiment of FIG. 21.

The condenser region 33, the subcooling section 48 and the evaporator region 36 are also each formed by a succession of multiple stacked disk elements, while the collector 34 is preferably formed from a single element. In alternative embodiments, however, the collector 34 may be formed in a structure of stacked disk elements.

Figure 24:
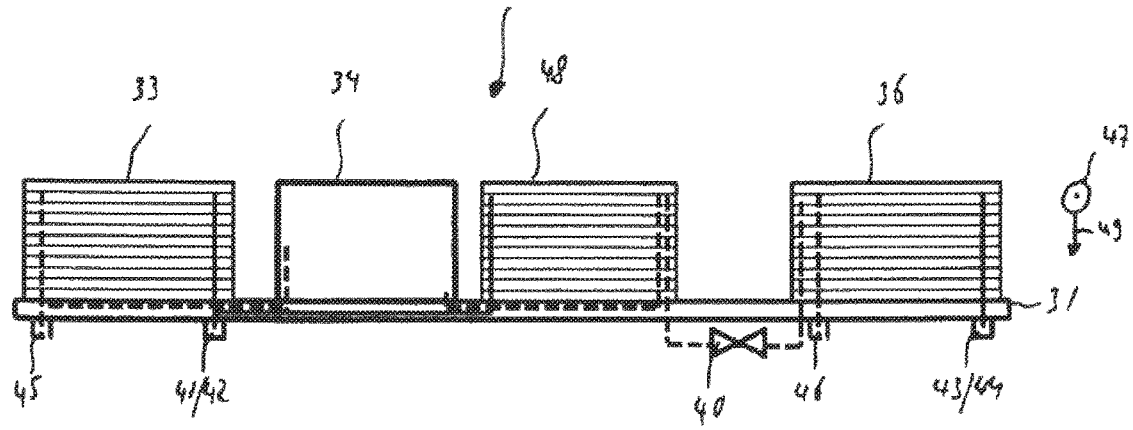
FIG. 24 is a plan view of the heating and cooling module according to FIG. 23.

FIG. 24, which shows a view of the heating and cooling module 30 counter the direction in space 47 from the top, in turn shows the arrangement of the various flow channels within the base plate 31.

Figure 25:
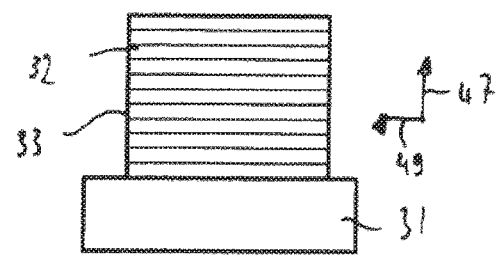
FIG. 25 is a schematic view of a heating and cooling module according to the invention, wherein in particular an alternative alignment of the heating and cooling module in the installed position is shown.

FIG. 25 illustrates an alternative orientation of a heating and cooling module 30 showing a condenser region 33 on a base plate 31. The spatial direction 47, which is directed from bottom to top in an imaginary final mounting position is now directed from the base plate 31 toward the end portion of the condenser region 33, facing away from the base plate 31. The second spatial direction 49 is parallel to the base plate 31, at a right angle to the direction in space 47.

Figure 26:
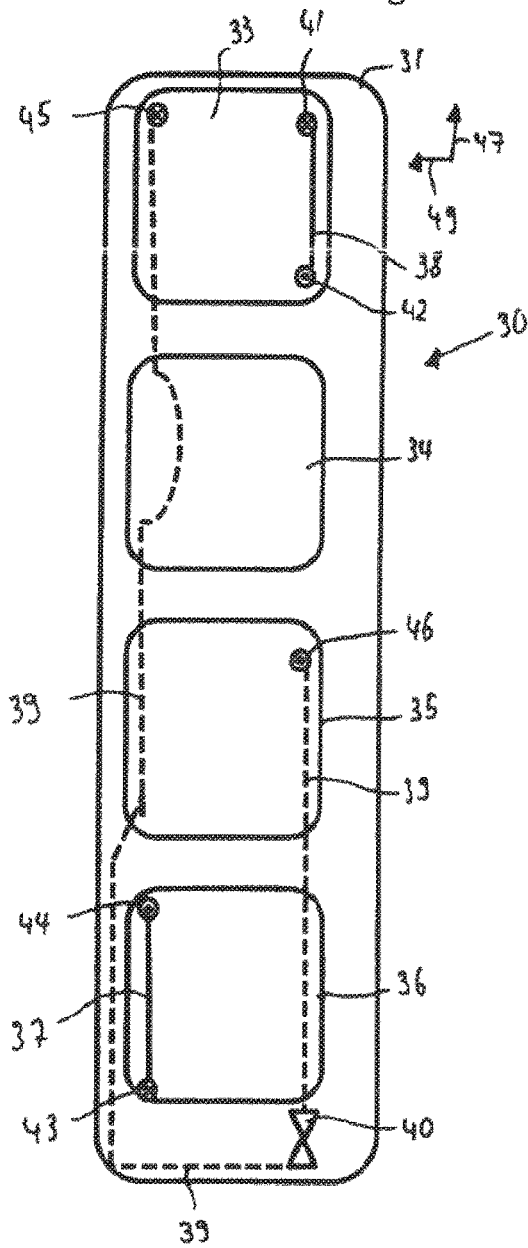
FIG. 26 is a schematic view of a heating and cooling module according to FIG. 19, wherein the orientation deviates from FIG. 19 and the individual heat transfer elements from top to bottom are a condenser region, a collector, an internal heat exchanger and an evaporator region.

FIG. 26 illustrates an alternative orientation of a heating and cooling module 30. The direction in space 47, which is directed along a mounting position from the bottom upwards, now runs parallel to the long side of the base plate 31. In the imaginary final mounting position, the heat transfer elements 33, 34, 35 and 36 are thus arranged from top to bottom. The condenser region 33 is arranged on a common outer surface of the base plate 31, thereby situated overhead, thereunder the collector 34, thereunder the internal heat exchanger 35 and thereunder the evaporator region 36. The condenser region 33 continues to be flowed through along the flow section 38 by a first coolant in a direction which is parallel to the direction in space 47. Likewise, the evaporator region 36 is flowed through by a coolant along the flow section 47 between the fluid ports 43 and 44, in a direction parallel to the direction in space 47.

As in the previous figures, the refrigerant is fed from the condenser region 33 over the collector 34, the internal heat exchanger 35 and the evaporator region 36, through an expansion valve 40, wherein in the different areas, a heat transfer with the refrigerant or with the coolant results.

Figure 27:
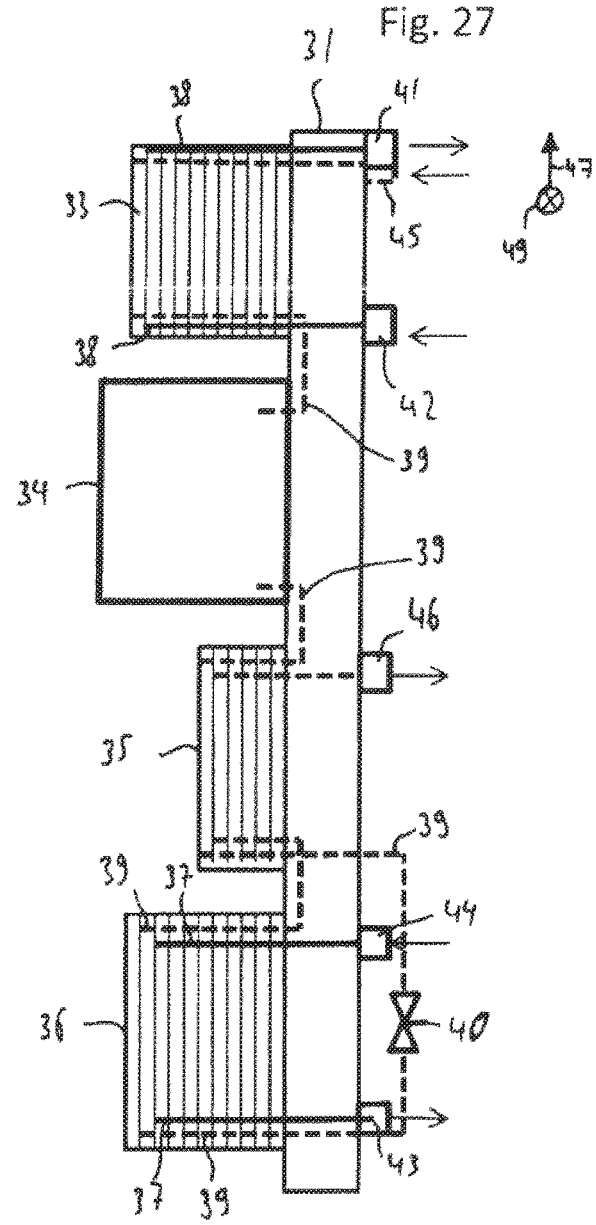
FIG. 27 is a side view of the heating and cooling module according to FIG. 26.

FIG. 27 shows a view of the heating and cooling module 30 of FIG. 26, wherein the viewer's gaze is directed along the spatial direction 49 of FIG. 26. The base plate 31 thereby has the heat transfer elements 33 to 36 leading to the left, and the fluid ports 41 to 46 leading to the right. Further, the flow channels for the fluid connection of the individual heat transfer elements 33 to 36 are arranged inside the base plate 31.

In contrast to the previous figures, FIG. 27 shows that the individual heat transfer elements 33 to 36 in particular may have different extents. In this way, the different areas can be dimensioned in particular depending on the required cooling or heating capacity.

The individual heat transfer elements 33 to 36 and 48 can be, in particular, attached to the base plate 31 in a thermally insulated manner. This applies to all the previously shown embodiments of FIGS. 1 to 27. In this way, an undesirable heat transfer between the individual heat transfer elements 33, 34, 35, 36 and 48, and the coolants and refrigerant flowing within the heat transfer elements 33, 34, 35, 36 and 48, can be reduced.

As mentioned in the previous figures, the final assembly direction of the individual heating and cooling modules 30 may differ, as well as the flow direction of the individual flow channels and flow sections 37, 38 and 39. In this way, different flow scenarios can be achieved within the heating and cooling modules 30.

Furthermore, due to the arrangement of the individual disk elements or the openings between the disk elements or the structuring of the collector 34, a divergent flow can be generated in each individual heat transfer element 33 to 36 and 48. In this case, in particular, areas can be generated in which refrigerant and coolant or refrigerant and refrigerant can flow to each other co-currently or in countercurrent. Here, the representation of FIGS. 18 to 27 sets no limits to the structure of the individual heat transfer elements 33 to 36 and 48. The individual heat transfer elements 33 to 36 and 48 may be constructed, in particular, in accordance with the solutions known from the prior art for individual condenser regions, evaporator regions, collectors, internal heat exchangers or subcooling sections. FIGS. 18 to 27 have no restrictive effect in this respect.

In addition to FIGS. 18 to 27, the individual flow concepts which are illustrated in schematic views in FIGS. 1 to 17 can also be conferred on a heating and cooling module 30 designed analog of the inventive embodiments of FIGS. 18 to 27. Here, FIGS. 1 to 17 in particular represent a non-exhaustive list of the various connection options of the individual heat transfer elements with one another. This may be conferred without limitation on the structures of FIGS. 18 to 27.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heating and cooling module for controlling a temperature of at least two coolant circuits, the module comprising:

an evaporator region having a first flow path that is adapted to be traversed by a first coolant;

a condenser region having a second flow path that is adapted to be traversed by a second coolant; and a third flow path that is adapted to be traversed by a refrigerant;

a common base plate on which the evaporator region and the condenser region are arranged, the base plate having a first fluid inlet and a first fluid outlet for the first coolant, a second fluid inlet and a second fluid outlet for the second coolant and a third fluid inlet and a third fluid outlet for the refrigerant, the base plate having flow channels through which in each case one of the coolants or the refrigerant is adapted to flow, wherein the evaporator region is in fluid communication with the first fluid inlet and the first fluid outlet of the base plate via the flow channels and the condenser region is in fluid communication with the second fluid inlet and the second fluid outlet of the base plate via the flow channels, wherein, on or in the base plate, a collector is arranged, which collects and stores the refrigerant, wherein a subcooling region is arranged on the base plate, the subcooling region being in fluid communication with the flow channels of the base plate and is adapted to be flowed through, wherein an internal heat exchanger is arranged on the base plate, the internal heat exchanger being in fluid communication with the flow channels of the base plate and is adapted to be flowed through by the refrigerant, and wherein the third fluid inlet, the third fluid outlet and the flow channels are arranged such that the refrigerant in the third flow path first flows through the condenser region, then through the collector, then through the subcooling region, then through the internal heat exchanger, then through the evaporator region and then back through the internal heat exchanger before exiting the base plate via the third fluid outlet.

2. The heating and cooling module according to claim 1, wherein, on or in the base plate, a thermostatic expansion valve is arranged that is flowed through by the refrigerant.

3. The heating and cooling module according to claim 1, wherein at least one of the evaporator region, the condenser region, the internal heat exchanger, the subcooling region or the collector is formed in a stacked-plate design by a succession of multiple disk elements.

4. The heating and cooling module according to claim 1, wherein the evaporator region and the condenser region are each formed in a stacked-plate design by a succession of multiple disk elements and wherein the evaporator region and the condenser region disposed on the base plate are arranged adjacent to one another on an outer surface of the base plate in a direction transverse to a stacking direction of the multiple disk elements.

5. The heating and cooling module according to claim 1, wherein at least one of the condenser region, the evaporator region, the collector, the internal heat exchanger or the subcooling region are formed by common disk elements.

6. The heating and cooling module according to claim 1, wherein the base plate comprises the flow channels, through which the evaporator region and the condenser region, that are not arranged directly adjacent to one another, are fluidly connected to one another.

7. The heating and cooling module according to claim 1, wherein the base plate is constructed in several parts, wherein the flow channels are arranged in the interior of the base plate.

8. The heating and cooling module according to claim 1, wherein the first fluid inlet, the first fluid outlet, the second fluid inlet, the second fluid outlet, the third fluid inlet and the third fluid outlet are arranged on a common outer surface of the base plate.

9. The heating and cooling module according to claim 1, wherein an outer surface of the base plate having the first fluid inlet, the first fluid outlet, the second fluid inlet, the second fluid outlet, the third fluid inlet and the third fluid outlet lies opposite an outer surface on which the evaporator region and the condenser region are arranged.

10. The heating and cooling module according to claim 1, wherein the evaporator region and the condenser region are thermally insulated from each other.

11. The heating and cooling module according to claim 1, wherein the evaporator region and the condenser region have different outer dimensions and a different internal volume.

12. The heating and cooling module according to claim 1, wherein the base plate has positioning elements, which form a receiving area for at least one of the evaporator region or the condenser region.

13. The heating and cooling module according to claim 1, wherein the refrigerant exits the base plate via the third fluid outlet directly after flowing back through the internal heat exchanger.

14. The heating and cooling module according to claim 9, wherein, in a top view of the heating and cooling module, the second fluid inlet, the second fluid outlet and the third fluid inlet are positioned so as to be aligned with the condenser region, the third fluid outlet is positioned so as to be aligned with the internal heat exchanger and the first fluid inlet and the first fluid outlet are positioned so as to be aligned with the evaporator region.

15. The heating and cooling module according to claim 1, wherein the collector is further used for filtering and drying the refrigerant.

* * * * *